United States Patent [19]

Scholl et al.

[11] Patent Number: 4,908,767
[45] Date of Patent: Mar. 13, 1990

[54] ACCELERATION MEASURING SYSTEM

[75] Inventors: Stephen R. Scholl; Michael D. Valentine, both of Cincinnati, Ohio

[73] Assignee: Valentine Research, Inc., Cincinnati, Ohio

[21] Appl. No.: 4,123

[22] Filed: Jan. 16, 1987

[51] Int. Cl.⁴ .............................................. G01P 15/00
[52] U.S. Cl. ..................................... 364/453; 364/566; 73/505; 73/510
[58] Field of Search ....................... 364/453, 566, 559; 73/505, 510, 512, 517 R, 517 A, 526

[56] References Cited

U.S. PATENT DOCUMENTS

| 3,071,008 | 1/1963  | Steele           | 73/504    |
| 3,094,877 | 6/1963  | Gold             | 73/517 R  |
| 3,272,972 | 9/1966  | Yamron et al.    | 364/543   |
| 3,545,285 | 12/1970 | Hall             | 73/517 R  |
| 3,633,003 | 1/1972  | Talwani          | 364/453   |
| 3,712,109 | 1/1973  | Haken            | 73/517 R  |
| 3,713,343 | 1/1973  | Segerdahl et al. | 73/517 R  |
| 4,038,527 | 7/1977  | Brodie et al.    | 364/453   |
| 4,212,443 | 7/1980  | Duncan et al.    | 244/177   |
| 4,222,272 | 9/1980  | Mainson          | 73/517 R  |
| 4,262,861 | 4/1981  | Goldstein        | 244/3.2   |
| 4,318,300 | 3/1982  | Maughmer         | 364/453 X |
| 4,347,573 | 8/1982  | Friedland        | 364/453   |
| 4,393,709 | 7/1983  | Harumatsu et al. | 73/503    |
| 4,445,376 | 5/1984  | Merhav           | 73/510    |
| 4,507,737 | 3/1985  | La Sarge et al.  | 364/453   |
| 4,590,801 | 5/1986  | Merhav           | 73/510    |

OTHER PUBLICATIONS

Garg et al, "Strapdown Navigatigation Technology: A Literature Survey", J. Guidance and Control, vol. 1,. No. 3, pp. 161–172.

Primary Examiner—Parshotam S. Lall
Assistant Examiner—Thomas G. Black
Attorney, Agent, or Firm—Killworth, Gottman, Hagan & Schaeff

[57] ABSTRACT

An acceleration measuring system, mountable on the body of a vehicle of the type having a suspension system which permits the vehicle to pitch and roll with respect to the surface over which the vehicle travels, determines and displays the lateral and forward acceleration of the vehicle in the plane of the surface. The system includes an acceleration transducer arrangement which provides indications of acceleration in nominal lateral, forward, and vertical directions. A programmed microprocessor transforms these indications of acceleration to a coordinate system in which two axes are parallel to the surface. A display provides a visual display of acceleration in the two axes.

10 Claims, 3 Drawing Sheets

ACCELERATION MEASURING SYSTEM

BACKGROUND OF THE INVENTION

The present invention relates to a system for providing an indication of the acceleration experienced by a vehicle in the plane of the surface over which the vehicle moves and, more particularly, for providing such an indication for a vehicle of the type having a suspension system which permits the vehicle body to pitch and roll.

The dynamic forces which act upon a vehicle, such as an automobile, as it travels over an arbitrary course are of particular interest to race drivers, vehicle designers, tire manufacturers, and others. Particularly meaningful is acceleration data with respect to the lateral axis and forward axis of the vehicle, taken in the plane of the road, track, or other surface over which the vehicle travels. Such acceleration data can be presented visually in a "g—g diagram," as suggested by R. S. Rice in SAE paper No. 730018, January 1973, A g—g diagram is a plot of acceleration showing lateral acceleration along a horizontal axis and forward acceleration along a vertical axis, with successive points on the plot defining a path which illustrates the acceleration experienced over time.

Regardless of the manner in which acceleration data is displayed, one significant difficulty in obtaining meaningful data for a land vehicle, such as an automobile, is that the measurement accelerometers are generally mounted within the passenger compartment of the vehicle body. The vehicle body, in turn, is supported on a suspension system which permits limited roll and pitch to enhance passenger comfort and vehicle handling. As the vehicle is driven over an arbitrary course, the measurement axes of the accelerometers in the vehicle body will continually change in an unpredictable fashion as the vehicle traverses hills in various directions, as the vehicle travels around curves in the course, and as the vehicle changes speeds. The pitch and roll of the vehicle body, in combination with the presence of the force of gravity, dramatically affect the measured acceleration values.

One approach for eliminating body roll as a source of error has been to provide a horizontally stabilized reference platform, typically by means of one or more gyroscopes, which keeps reference axes of the accelerometers independent of the roll and pitch motions of the vehicle body. Such a system is disclosed, for example, in U.S. Pat. No. 3,094,877, issued June 25, 1963. This approach has several disadvantages, not the least of which is the high cost of gyroscopic instruments. Additionally, since the forward and lateral measurement axes are continually maintained in a truly horizontal plane, the acceleration measurements accurately reflect the acceleration experienced by the vehicle in the plane of the road surface only when the vehicle is driven on a perfectly flat, level track. Acceleration data from such horizontally stabilized accelerometers are not very meaningful when the vehicle is driven over terrain that is sloped in any manner.

Consider, for example, a car traveling a banked circular track at the so-called hands-off speed, at which the downward force of gravity is counteracted by the centrifugal force arising from the circular path. Under these circumstances, there is no lateral force acting upon the vehicle tires, yet a horizontally stabilized accelerometer system would provide an output indicating centripital acceleration.

As a second example, consider a car at rest on a banked surface. A leveled accelerometer would measure zero lateral acceleration, yet the tires must sustain a lateral load of Mg sin ($\theta$), where Mg is the weight of the car and $\theta$ is the inclination of the track. As stated previously, for drivers, vehicle designers, tire manufacturers, and others interested in measuring vehicle acceleration forces, acceleration data is most meaningful if measured in the plane of the road surface. Such acceleration data corresponds to the forces acting at the interface between the tires and the road surface and is valid for any track path or inclination. Analysis of such data can yield insight into tire performance, driver expertise, and car capability in forward acceleration, braking, and cornering that has applicability to any road surface or configuration.

Various prior art acceleration measuring systems have dealt with the problems encountered in measuring acceleration in an axis or coordinate system which is not aligned with the axis or coordinate system of interest. One such system is disclosed in U.S. Pat. No. 3,094,877, issued June 25, 1963, to Gold. The Gold patent discloses an acceleration measuring system for an aircraft which measures the acceleration of the craft moving down a runway in a direction parallel to the direction of movement. Acceleration measurements are made by a pair of accelerometers which are aligned parallel to and perpendicular to the longitudinal axis of the airplane, respectively. The Gold system utilizes a simple analog circuit which provides an estimation of the pitch of the airplane based upon the deviation in the nominal vertical acceleration from an expected 1g reading. The Gold system is incapable of measuring a lateral acceleration and, additionally, is subject to errors due to bumps in the runway surface. Finally, the Gold system requires that the accelerometers be precisely aligned with the longitudinal axis of the aircraft.

Other similar acceleration measuring systems are disclosed in U.S. Pat. No. 3,713,343, issued Jan. 30, 1973, to Segerdahl et al; U.S. Pat. No. 3,712,109, issued Jan. 23, 1973, to Haken; U.S. Pat. No. 3,272,972, issued Sept. 13, 1966 to Yamron et al; and "Strap Down Navigation Technology: A Literature Survey", by Garg et al, J. Guidance and Control, Vol. 1, No. 3, May–June 1978, pages 161–172. None of these acceleration measuring systems relate to deriving forward and lateral acceleration data in the plane of the surface over which a vehicle moves by measurement of acceleration with accelerometers in vehicle body which is subject to pitch and roll.

Accordingly, it is seen that there is a need for improved acceleration measuring system which accurately determines the forward and lateral acceleration of a vehicle in the plane of the road or track surface from acceleration measurements taken in three nominally orthogonal axes defined with respect to the vehicle body.

SUMMARY OF THE INVENTION

This need is met by a system according to the present invention for providing an indication of the acceleration experienced by a vehicle in the plane of the surface over which the vehicle moves, in which the system is mountable on the vehicle body and in which the suspension system of the vehicle permits the vehicle body to pitch and roll with respect to the surface when the vehicle is subjected to acceleration. The system includes an acceleration transducer means for providing indications of acceleration in nominal lateral, forward and vertical directions and a processor means for transforming the indications of acceleration to a coordinate system in which two axes are parallel to the surface. The processor means includes a leveling means, responsive to the indications from said acceleration transducer means, for providing lateral and forward indications of acceleration in a reference plane and vertical acceleration normal to the reference plane, with reference plane being fixed with respect to the body of the vehicle and parallel to a horizontal surface supporting the vehicle when the vehicle is at rest. The processor means further includes roll and pitch compensation means, responsive to said indications from the leveling means, for providing indications of lateral and forward acceleration in the plane of the surface. A display means, responsive to the roll and pitch means, displays the indications of lateral and forward acceleration in the plane of the surface.

Preferably, the leveling means performs the transformation:

$$[\text{LEVEL}] = \begin{bmatrix} \cos\beta & -\sin\alpha\sin\beta & -\cos\alpha\sin\beta \\ 0 & \cos\alpha & -\sin\alpha \\ \sin\beta & \sin\alpha\cos\beta & \cos\alpha\cos\beta \end{bmatrix} [\text{TRANSDUCER}],$$

where [LEVEL] is the acceleration vector with respect to the reference plane, [TRANSDUCER] is the acceleration vector in the nominal lateral, forward and vertical directions, $\alpha$ is the angle between the nominal forward direction and the reference plane, and $\beta$ is the angle between the nominal lateral direction and the reference plane.

Preferably, the roll and pitch compensation means performs the transformation:

$$[\text{SURFACE}] = \begin{bmatrix} \cos\theta & -\sin\phi\sin\theta & -\cos\phi\sin\theta \\ 0 & \cos\phi & -\sin\phi \\ \sin\theta & \sin\phi\cos\theta & \cos\phi\cos\theta \end{bmatrix} [\text{LEVEL}],$$

where [SURFACE] is the acceleration vector with respect to the surface, [LEVEL] is the acceleration vector with respect to the reference plane, $\theta$ is the angle of roll of the vehicle body with respect to the surface, and $\phi$ is the angle of pitch with respect to the surface. The roll and pitch compensation means determines $\theta$ and $\phi$ by the approximations:

$\theta = xR/(1+zR)$ and $\phi = yP/(1+zP)$, where x is the lateral acceleration component of the vector [LEVEL], z is the vertical acceleration component of the vector [LEVEL], y is the forward acceleration component of the vector [LEVEL], R is roll sensitivity of the vehicle, and P is the pitch sensitivity of the vehicle.

The acceleration transducer means may comprise a three axis accelerometer transducer, and a three channel low pass filter. The filter is responsive to the transducer and provides the indications of acceleration in nominal lateral, forward and vertical directions.

The processor means may comprise an analog to digital converter means for converting the indications of acceleration in nominal lateral, forward and vertical directions to digital form and for supplying indications of acceleration in digital form to the leveling means. The leveling means and said roll and pitch compensation means comprise a programmed digital microprocessor. The processor means may further include a CMOS random access memory and a battery power supply for the memory. The processor means may also comprise keypad means for manual entry of data and control commands. The display means preferably is a dot matrix display, such as a vacuum fluorescent display.

An acceleration measurement system according to the present invention, mountable on the body of a vehicle of the type having a suspension which permits the vehicle body to pitch and roll with respect to the surface over which the vehicle travels, measures lateral and forward acceleration of the vehicle in the plane of the surface. The system includes an acceleration transducer means, a processor means, and a display means. The acceleration transducer means provides indications of acceleration in nominal lateral, forward, and vertical directions. The processor means transforms the indications of acceleration from the acceleration transducer means to a coordinate system in which two axes of the coordinate system are parallel to the surface. The display means is responsive to said roll and pitch means and displays indications of acceleration in the two axes in the plane of the surface.

Accordingly, it is an object of the present invention to provide a system, mountable on the body of a vehicle, for measuring the lateral and forward acceleration of a vehicle in the plane of the surface over which the vehicle travels; to provide such a system in which nominal lateral, forward and vertical acceleration measurements are made and transformed to a coordinate system which is fixed with respect to the body of the vehicle; and to provide such a system in which the roll and pitch of the vehicle are taken into account.

Other objects and advantages of the invention will be apparent from the following description, the accompanying drawings and the appended claims.

DETAILED DESCRIPTION OF THE PREFERRED EMBODIMENT

Figure 1:
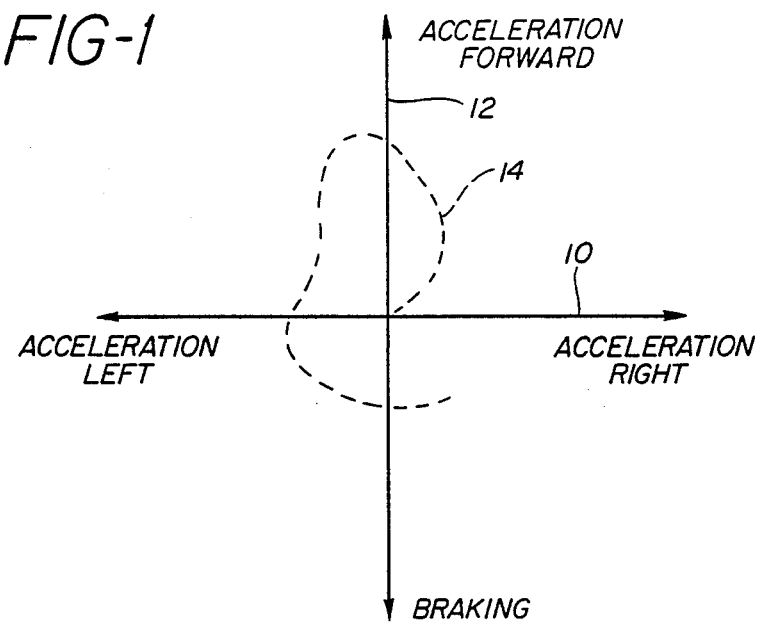
FIG. 1 is a representation of a g—g diagram display of the type provided by the present invention.

The present invention relates to a measurement and display system to provide an indication of the dynamic forces which act on a vehicle as it is maneuvered over an arbitrary course. As is known, acceleration data may be meaningfully depicted in a two-axis display, such as illustrated in FIG. 1, in which instantaneous lateral and fore/aft accelerations acting upon the vehicle are simultaneously presented. This display technique is commonly termed a "g—g diagram," since lateral acceleration is displayed along axis 10 at the same time that forward acceleration is displayed along axis 12. A series of plot points of the acceleration experienced over time trace out a path 14.

The system of the present invention provides a g—g diagram display of the acceleration experienced by a vehicle, and this information is made even more meaningful by presenting the acceleration indications in axes which are parallel to the plane of the road surface. It will be appreciated, however, that other data presentation modes may also be of interest and the present system therefore also is capable of graphically displaying either lateral or forward acceleration versus time. Additionally, acceleration levels may also be displayed numerically.

Figure 2:
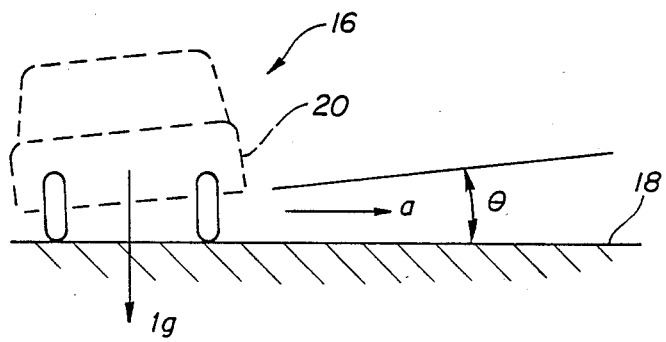
FIG. 2 is a schematic representation of a vehicle experiencing roll in response to lateral acceleration.

The present system is mounted in the passenger compartment of an a vehicle, such as automobile, but provides acceleration data in the plane of the road surface. As a consequence, it must take into account the fact that vehicle body is supported by a suspension system which permits the body to roll and pitch in response to acceleration forces, changing the measurement axes of the acceleration transducers. Consider FIG. 2 which illustrates an automobile 16 on a level track 18 experiencing a rightward acceleration of $\alpha$ and an acceleration induced roll angle of the vehicle body 20 of $\theta$. A laterally directed, body-mounted accelerometer (not shown) is subjected to a portion of the force of gravity and will therefore produce an output of a $(\cos \theta) + g(\sin \theta)$, whereas the desired output is a. To illustrate, using representative numbers of a=0.7g and $\alpha$=7 degrees, the accelerometer will product an output of 0.82g instead of the desired output of 0.7 g, yielding an error of +17%. Since it is highly desirable for the measurement system to be located in the passenger compartment of the vehicle, the present invention addresses the problem of compensating for the contamination of the accelerometer data by the gravity acceleration component arising from induced body roll and pitch.

Measuring the fore/aft and lateral accelerations required for generation of the g—g diagram, in principle, requires only two accelerometers aligned with the corresponding axes of the vehicle. However, a fundamental feature of the present invention is the use of data from three orthogonally oriented accelerometers. As will be shown, the availability of a third axis of acceleration data, nominally in the vertical direction, in addition to two axes of acceleration data, nominally in the forward and lateral directions, affords numerous benefits in improved accuracy, ease of installation and alignment, and permits the resulting g—g diagram to depict lateral tire loads arising from changes in elevation on a banked track that would otherwise be unrecognized.

Figure 3A:
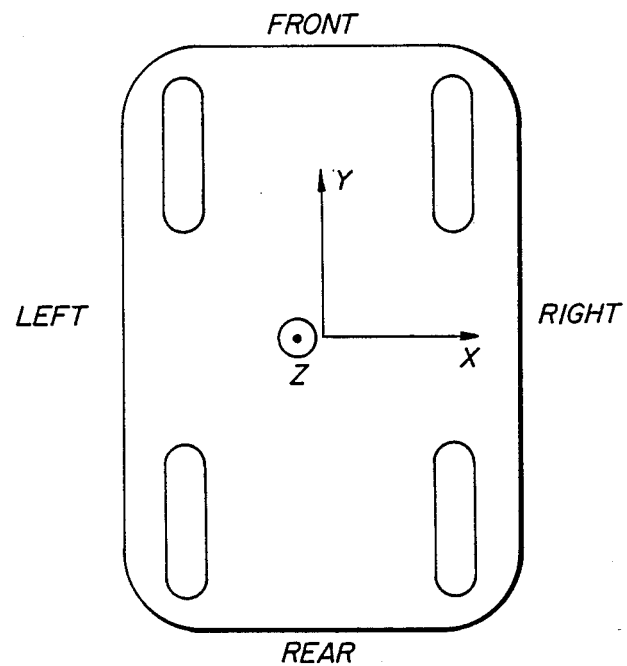
FIG. 3A is a schematic plan representation of a vehicle, illustrating a fixed coordinate system.
Figure 3B:
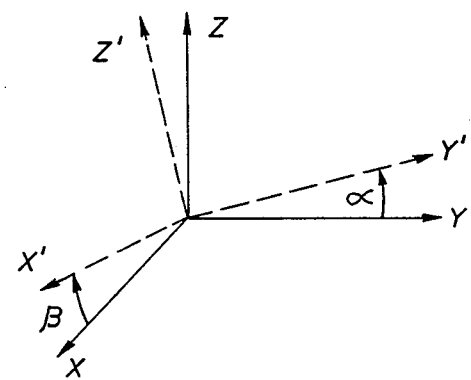
FIG. 3B is a schematic representation illustrating transformation between two coordinate systems.

The orientation of the three orthogonal accelerometers defines an input coordinate measuring system along whose axes vehicular accelerations are sensed. In a somewhat similar fashion the tire/pavement contact patches define the forward and lateral axes of the output, plane-of-the-road coordinate system with the third axis of this system being normal to the road surface. The present invention uses coordinate transformation to translate data from the input measurement axes into the output plane-of-the-road axes. FIGS. 3A and 3B illustrate these two coordinate systems, with the X', Y', Z' coordinate system in FIG. 3B being the input measurement coordinate system.

The orientation between the two coordinate systems can be broken down into several components. First is the relative orientation of the instrument case with respect to the forward lateral and vertical axes of the vehicle body. This is established at the time that the system is installed in the vehicle. The accelerometer axes should be fairly well aligned with the vehicle body axes for best accuracy. A second component is the orientation of the body with respect to the plane of the road. This component, in turn, can be broken down into three sub-components. One is the static orientation of the body with respect to the tire contact areas on the road surface, and the remaining components are the roll rotation and the pitch rotations of the vehicle body induced by forces acting horizontally upon the vehicle. The present invention mathematically establishes the orientation of the accelerometer axes with respect to the road surface when the car is at rest. The acceleration induced pitch and roll rotations are estimated, based in part on sensitivity specifications provided by the vehicle manufacturer. With these orientations established, the corresponding coordinate rotations transform the input data to the desired output plane-of-the track description.

In this embodiment of the invention, the coordinate transformations are made by treating the signals from a 3-axis accelerometer, mounted in the vehicle body, as a vector. This input vector is multiplied by a direction cosine matrix which yields a description of the applied acceleration in the output coordinate system. Alternate embodiments may employ other transformation methods, such as quaternions, Euler angles or simply trigonometric manipulations of the inputs. All these methods achieve the result of transforming data from the accelerometer axes to the plane-of-the-track output axes. A detailed discussion of matrix algebra and coordinate transformations will not be given here, since these techniques are described in most texts on inertial navigation, and may also be found in the "Handbook of Mathematical Tables," published by the Chemical Rubber Company.

Figure 4:
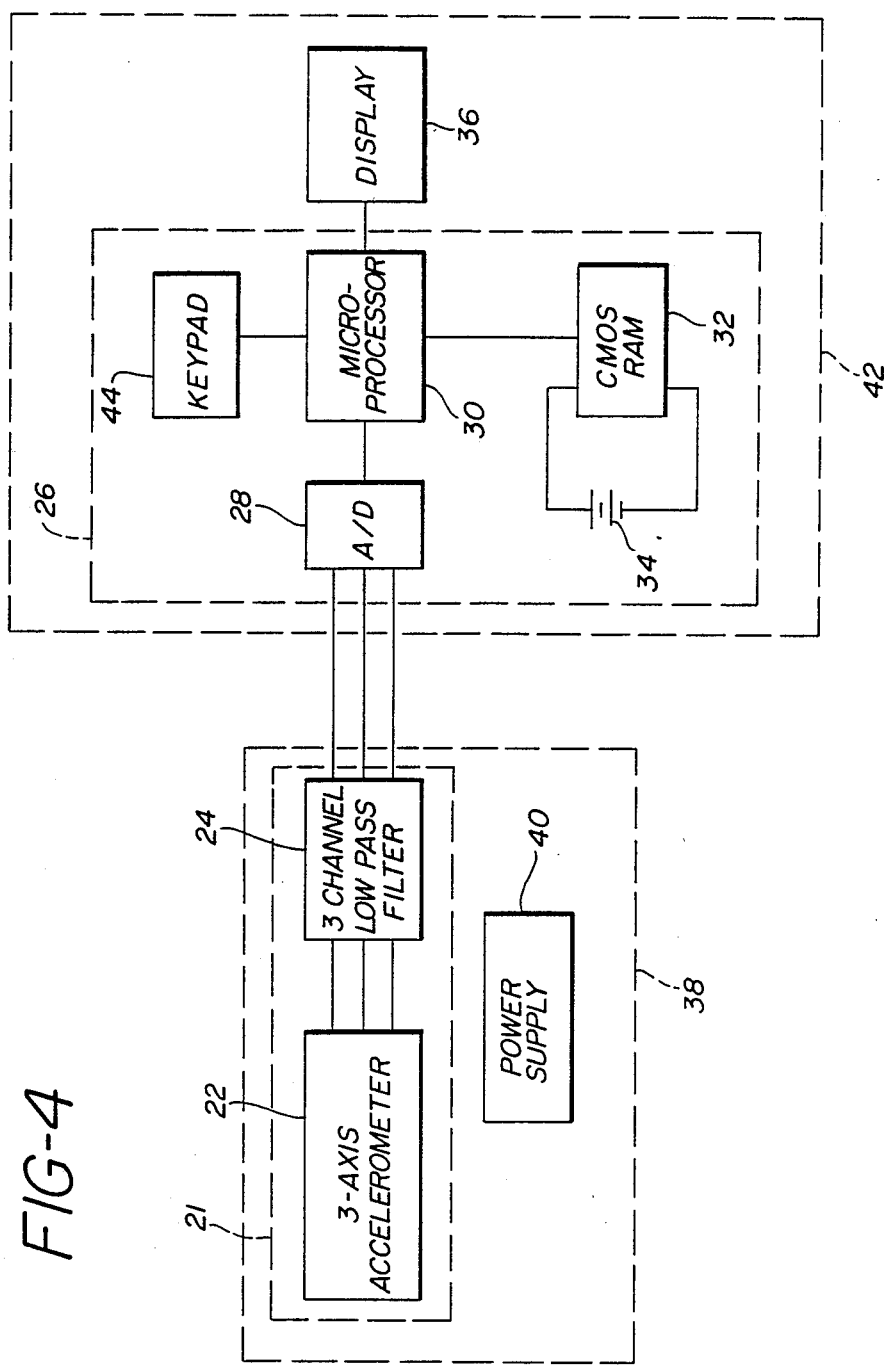
FIG. 4 is a schematic representation of the acceleration measurement system of the present invention.

FIG. 4 is a simplified block diagram of the system of the present invention. An acceleration transducer means 21 includes an array of three accelerometers 22, arranged with nominally orthogonal axes. The accelerometers are mounted in the vehicle body, and their axes are aligned generally with the vertical, lateral and forward axes of the body. The outputs of these transducers are filtered by low pass filters 24 to preclude aliasing errors during subsequent sampling. In the embodied invention, the sampling takes place at a 10 Hz rate and the low pass filters 24 possess a third order Bessel response which offers good preservation of the time domain signal characteristics. The outputs from filters 24 are supplied to a processor means 26. The filtered signals, providing indications of acceleration in nominal lateral, forward and vertical directions, are sampled and digitized by a 10 bit Analog-to-Digital converter 28 (A/D) whose output is, in turn, processed by a microcomputer 30. The A/D and microcomputer preferably comprise a single device, namely an Intel 8097 microcontroller. A Complementary Metal Oxide Semiconductor random access memory (CMOS RAM) 32 and attendant battery 34 provide for storage and retention of test data during periods when power is removed from the system. The processed output data is displayed on a vacuum fluorescent display 36 that preferably includes a 27×27 dot matrix array for graphical presentation of the data, as well as 7-segment numerical displays of acceleration magnitude and elapsed test time.

As shown in FIG. 4, the system is partitioned into two separate enclosures. The instrument enclosure 38 includes the transducers 22, low pass filters 24 and supporting power supply circuitry 40. It will be understood that the power supply 40 provides all necessary operating voltages and currents for the system. As mentioned above, for optimum accuracy the axes of the accelerometers 22 should be aligned with the axes of the vehicle body as closely as practicable. It is for this reason that the transducers are partitioned into a enclosure 38 for installation at a convenient location within the passenger compartment of the vehicle, such as under a seat. The display enclosure 42 is positioned in the vehicle for the easiest access to keypad 44 and viewing of display 36 by the operator.

The digital signal processing employed in the present invention will now be described. The first operation is the correction of misalignment errors in the accelerometer instrument transducers. The accelerometers employed in this embodiment are preferably of the pendulous force-rebalance variety. Due to manufacturing imperfections, the sensing mass of such a transducer may not be perfectly positioned within its frame. The result is that the axes of the three accelerometers are probably not precisely orthogonal, nor are they in precise alignment with the external surfaces of the instrument enclosure 38. A matrix multiplication operation may be utilized to compensate these misalignments and yield an output simulating a set of perfectly aligned transducers. This produces digitized acceleration values in directions of axes aligned with the instrument case and therefore nominally with the car body, assuming accurate installation of the enclosure 38 within the car. The second operation transforms the acceleration data into a first coordinate frame, fixed with respect to the vehicle body, that would be defined by the tire contact points for the vehicle at rest on level ground; that is, a coordinate system which is fixed with respect to the vehicle body and which has it lateral and forward axes in a plane which is horizontal when the vehicle is at rest on a horizontal surface. This coordinate rotation accounts for static misalignments of the instrument case with respect to the suspension of the vehicle.

The relative orientation between the first coordinate frame and a second coordinate frame, defined by the road surface would be unchanging under all circumstances of terrain and acceleration if it were not for the suspension system of the vehicle which allows the vehicle body to roll and to pitch in response to acceleration and gravitational forces. These roll and pitch rotations are estimated and a final coordinate rotation transforms the acceleration data into the desired plane-of-the-road coordinate system.

The method for estimation of the roll and pitch rotations utilizes the fact that roll and pitch sensitivities, as measured in radians/g, are relatively constant under most driving conditions. Vehicle suspensions permit generally linear roll and pitch in response to applied forces. The operator manually enters, by use of the key pad 44, the coefficients that describe this behavior for both the roll and pitch axes of the test vehicle. The system then uses these coefficients, in conjunction with the observed accelerations in the first coordinate frame, to estimate the roll and pitch rotation angles and the orientation of the second coordinate frame.

It will be appreciated that, if desired, a more accurate, albeit more expensive, approach may be taken in which the roll and pitch rotations are actually measured by means of height transducers. These transducers can be implemented with sonar ranging units of the type manufactured by Poloroid Corporation. Three sensors mounted near three corners of the body measure distance from the road surface and thereby determine the orientation of the body plane with respect to the road surface. More particularly, the microprocessor 30 notes changes in the ride height from reference positions established during a leveling procedure and, knowing the distance between the sensors (entered manually), uses the arctangent function to compute the required angles on a sample-by-sample basis.

As already discussed, an algorithm mathematically determines the orientation between the instrument case and a plane, defined by the body which is horizontal when the automobile is experiencing no body rotation forces and is at rest on level ground. It is possible to determine this orientation because when the vehicle is at rest on level ground, the output data taken along both nominal forward and lateral axes should be 0 and the vertical axis data should be 1 g. However, in general the instrument case will be misaligned with respect to the horizontal plane, and some portion of the force of gravity will appear in the each of the nominal horizontal channels. The algorithm determines the rotation matrix that will transform these misaligned outputs to a horizontal orientation.

Consider a car and its transducer on an inclined surface with the nose of the car pointing upgrade, so that the Y sensor subtends an angle $\alpha$ with respect to the horizontal plane. In similar fashion, the right side of the car points upgrade so that the X sensor subtends an angle $\alpha$ relative to the horizontal. Assume that the car attains this position by undergoing two successive rotations from the horizontal plane, a roll rotation of $\beta$ followed by a pitch rotation of $\alpha$, as shown in FIG. 3B. The direction cosine matrices describing these rotations are:

$$[\text{TRANSDUCER}] = [\text{PITCH}(\alpha)][\text{ROLL}(\beta)][\text{HORZ}] \quad (1)$$

$$= \begin{bmatrix} 1 & 0 & 0 \\ 0 & \cos\alpha & \sin\alpha \\ 0 & -\sin\alpha & \cos\alpha \end{bmatrix} \begin{bmatrix} \cos\beta & 0 & \sin\beta \\ 0 & 1 & 0 \\ -\sin\beta & 0 & \cos\beta \end{bmatrix} [\text{HORZ}], \quad (2)$$

$$= \begin{bmatrix} \cos\beta & 0 & \sin\beta \\ -\sin\alpha\sin\beta & \cos\alpha & \sin\alpha\cos\beta \\ -\cos\alpha\sin\beta & -\sin\alpha & \cos\alpha\cos\beta \end{bmatrix} [\text{HORZ}], \quad (3)$$

where [TRANSDUCER] is a vector representing the output of the tranducers in nominal forward, lateral and vertical directions and [HORZ] is a vector representing the applied accelerations in the horizontal reference frame. Each vectors' components are defined as x, y, z or correspondingly right acceleration, forward acceleration, vertical acceleration. With the car at rest, [HORZ]=[0,0,1 g]. Let the corresponding [TRANSDUCER] vector components be $X_G$, $Y_G$ and $Z_G$.

Then carrying out the matrix equation:

$$\begin{bmatrix} X_G \\ Y_G \\ Z_G \end{bmatrix} = \begin{bmatrix} \cos\beta & 0 & \sin\beta \\ -\sin\alpha\sin\beta & \cos\alpha & \sin\alpha\cos\beta \\ -\cos\alpha\sin\beta & -\sin\alpha & \cos\alpha\cos\beta \end{bmatrix} \begin{bmatrix} 0 \\ 0 \\ 1g \end{bmatrix} \quad (4)$$

yields $$X_G = g\sin\beta \quad (5)$$
$$Y_G = g\sin\alpha\cos\beta$$
$$Z_G = g\cos\alpha\cos\beta$$

$$\beta = \arcsin\frac{X_G}{g} \quad (6)$$
$$\alpha = \arcsin\frac{Y_G}{g\cos\beta}$$

Thus the misalignment of the instrument axes with respect to the horizontal can be calculated by simply taking data when the car is at rest. If the car is know to be on level ground, then the alignment procedure consists of taking a single data point and calculating the rotation matrix as will be detailed below. If the ground has a small but unknown grade, then the leveling procedure consists of a two step procedure. The car is parked and the first data point is recorded. The position of the tires is marked and the car is turned around 180 degrees and again parked with the tires in the same spots as in the first step (i.e. front wheel and rear wheel positions are now interchanged). The second data point is now taken. The $\alpha$ and $\beta$ angles from each trial are computed using the above formulii and then averaged respectively:

$$\alpha_{AVG} = \frac{\alpha_1 + \alpha_2}{2} \quad \beta_{AVG} = \frac{\beta_1 + \beta_2}{2} \quad (7)$$

This angle-averaging procedure cancels out the component of the misalignment that arises from the inclination of the road surface and only misalignment of the instrument with respect to the horizontal remains. The transducer to level transformation matrix may now be determined.

The level, or horizontal-to-transducer transformation was given above equation (3). The reverse transformation is simply the matrix inverse. Since transformation matrices are orthognal, the inverse is simply the matrix transpose wherein the rows and columns are interchanged. The required transducer-to-level transformation is therefore:

$$[\text{LEVEL}] = \quad (8)$$

$$\begin{bmatrix} \cos\beta & -\sin\alpha\sin\beta & -\cos\alpha\sin\beta \\ 0 & \cos\alpha & -\sin\alpha \\ \sin\beta & \sin\alpha\cos\beta & \cos\alpha\cos\beta \end{bmatrix} [\text{TRANSDUCER}],$$

To reiterate, the transducer to level rotation, performed by the microprocessor 30 transforms the data from the nominal instrument axes to the plane of the road, except for the additional misalignment arising from body roll and pitch. The body roll correction transformation is developed in a similar manner. Acceleration forces are assumed to induce body roll of $\theta$ and pitch of $\phi$ that rotate the first or "leveled" coordinate frame away from the plane of the track. The plane-of-track to body-rotated transformation has the same form as the level-to-transducer transformation described in (3) above. Therefore to rotate the displaced coordinate frame back to the plane of the track requires use of the inverted, i.e. transposed matrix. Thus a second application of the type of transformation given in (9), where $\theta$ and $\phi$ are the respective pitch and roll rotations, transforms the "leveled" data back to the plane of the surface.

$$[\text{SURFACE}] = \begin{bmatrix} \cos\theta & -\sin\phi\sin\theta & -\cos\phi\sin\theta \\ 0 & \cos\phi & -\sin\phi \\ \sin\theta & \sin\phi\cos\theta & \cos\phi\cos\theta \end{bmatrix} [\text{LEVEL}] \quad (9)$$

The formula used to estimate the roll and pitch angles $\theta$ and $\phi$ will now be described.

Consider a vehicle experiencing lateral acceleration of a, vertical acceleration of v, and a resulting roll rotation of $\theta$. The body aligned horizontal (x) and verticle (z) accelerometers will sense:

$$x = a\cos\theta + v\sin\theta \quad (10)$$
$$z = -a\sin\theta + v\cos\theta$$

If the suspension's roll sensitivity is R, expressed in radians/g, then:

$$x = a\cos(aR) + v\sin(aR) \quad (11)$$
$$z = -a\sin(aR) + v\cos(aR)$$

Solution of these two equations in two unknowns would yield the lateral acceleration a. Computation of the solution may be simpified by employing a few approximations. Since the rotation angles seldom reach 0.25 radians, small angle approximations may be utilized:

$$\sin(aR) = aR; \cos(aR) = 1 \quad (12)$$

Appropriate substitution yields:

$$x = a + vaR \quad (13)$$

$$z = -a^2 R + v \quad (14)$$

Solving for v and substituting yields:

$$x = a + aR(z + a^2 R) = a + aRz + a^3 R^2 \quad (15)$$

Solution of this cubic equation can be circumvented by discarding the $a^3 R^2$ term, which yields a tolerable error of less than 5% in the estimated rotation angle. Solution of the resulting linear equation yields an estimate of the lateral acceleration, a':

$$a' = x/(1+zR) \quad (16)$$

Thus the estimated roll angle $\theta'$ is $$\theta' = a'R = xR/(1+zR) \quad (17)$$

The estimated rotation angle $\theta'$ is used for the rotation transformation because this technique results in a smaller error in computed acceleration than if the estimated acceleration from (16) is used directly.

A numerical example will illustrate:
Assume $a=1.0$, $v=1.0$, $R=0.2$ rad/g$=11.4$/g
Then $\theta'=0.2$ rad and $$x = \cos 0.2 + \sin 0.2 = 1.179$$

$$z = -\sin 0.2 + \cos 0.2 = 0.7814$$

Then $a' = x/(1+zR) = 1.02$ g (vs. 1.00 g ideally) and $\theta' = a'R = 0.2039$ rad (vs. 0.2000 rad ideally).

The transformed x output is x cos 0.2039 − z sin 0.2039 = 0.0996 g (−0.4% error).

In a similar manner, the pitch rotation is esimated from the following formula:

$$\phi' = yP/(1+zP) \quad (18)$$

where y is the forward acceleration and P is the pitch sensitivity in radians/g. The estimated pitch and roll angles are now used in the transformation of equation (9) to produce the desired acceleration values, both lateral and forward, in the plane of the road surface. These values are supplied to display 36 for viewing by the operator in any of a number of formats. Additionally, these values are stored in memory 32, permitting later analysis and review.

The above transformations are accomplished by means of the microprocessor 30 under control of a computer program permanently stored in microprocessor 30, a copy of which follows.

The Cybernetic Micro Systems 8096 Family Assembler, Version 3.03   12-22-86

```
            ;$NOLIST
1           INCLUDE 8096.ASC
1           ;################################################################
1           ; 8096.INC - DEFINITION OF SYMBOLIC NAMES FOR THE I/O REGISTERS OF THE 8096
1           ;           (C) INTEL CORPORATION 1983
1           ;################################################################
1           ;
10000 =     R0          EQU   000H    ;WORD:  R   ZERO REGISTER
10002 =     AD_CMD      EQU   002H    ;BYTE:      W
10002 =     AD_LO       EQU   002H    ;BYTE:  R
10003 =     AD_HI       EQU   003H    ;BYTE:  R
10003 =     HSI_MODE    EQU   003H    ;BYTE:      W
10004 =     HSO_TIME    EQU   004H    ;WORD:      W
10004 =     HSI_TIME    EQU   004H    ;WORD:  R
10006 =     HSI_STATUS  EQU   006H    ;BYTE:  R
10006 =     HSO_CMD     EQU   006H    ;BYTE:      R/W
10007 =     SBUF        EQU   007H    ;BYTE:      R/W
10008 =     INT_MASK    EQU   008H    ;BYTE:      R/W
10009 =     INT_PENDING EQU   009H    ;BYTE:      R/W
1000A =     WATCHDOG    EQU   00AH    ;BYTE:      W   WATCHDOG TIMER
1000A =     TIMER1      EQU   00AH    ;WORD:  R
1000C =     TIMER2      EQU   00CH    ;WORD:  R
1000E =     BAUD_RATE   EQU   00EH    ;BYTE:      W
1000E =     IOPORT0     EQU   00EH    ;BYTE:  R
1000F =     IOPORT1     EQU   00FH    ;BYTE:      R/W
10010 =     IOPORT2     EQU   010H    ;BYTE:      R/W
10011 =     SP_CON      EQU   011H    ;BYTE:      W
10014 =     HSO_REG     EQU   014H    ;BYTE:  R
```

```
I0015 =         IOC0            EQU     015H    ;BYTE:  W
I0015 =         IOS0            EQU     015H    ;BYTE:  R
I0016 =         IOC1            EQU     016H    ;BYTE:  W
I0016 =         IOS1            EQU     016H    ;BYTE:  R
I0017 =         PWM_CONTROL     EQU     017H    ;BYTE:  W
I0017 =         IOS2            EQU     017H    ;BYTE:  R
I0018 =         SP              EQU     018H    ;WORD:  R/W

I               INCLUDE DSEG.ASC                ;GET DATA ASSIGNMENTS
IBBE0                   ORG 0BBE0H
I
IBBE0           OLD_IA_M:               DS 18   ;INPUT AXIS CORRECTION MATRIX
IBBF2           LEVEL_M:        DS  18          ;LEVEL ROTATION MATRIX
IBC04           COMP_M:         DS  18          ;COMPOSITE MATRIX = [LEVEL]*[IA CORRECT]
IBC16           LOCAL_GRAV:     DS  2           ;LOCAL GRAVITY
IBC18           ROLL1:          DS  4           ;ROLL ANGLE AT POSITION 1
IBC1A =         PITCH1 EQU ROLL1+2              ;PITCH ANGLE AT POSITION 1
IBC1C           ROLL_GAIN:      DS  2           ;RADIANS/ACCEL BODY ROLL SENSITIVITY
IBC1E           PITCH_GAIN:     DS  2           ;RADIANS/ACCEL BODY PITCH SENSITIVITY
IBC20           OFFSET:         DS  2           ;OFFSET CHANNEL
IBC22           OVF_FLG:        DS  2           ;A/D CLIPPING FLAGS
IBC24           FILLER:         DS  2           ;
IBC26           BIN_ROLL_GAIN:  DS  2           ;BIN REPRESENTATION OF ROLL_GAIN
IBC28           BIN_FITCH_GAIN: DS  2           ;BIN REPRESENTATION OF PITCH_GAIN
IBC2A           TEMP_RAD_AG:    DS  2           ;TEMP STORAGE OF RADIAN ANGLE GAIN TIL PERMANENT ENTRY
I
IBC2C           ROLL_X_SLOW:    DS  2           ;AVERAGE X VECTOR DURING LOW SPEED ROLL RUN
IBC2E           ROLL_Y_SLOW:    DS  2           ;AVERAGE Y VECTOR DURING LOW SPEED ROLL RUN
IBC30           ROLL_Z_SLOW:    DS  2           ;AVERAGE Z VECTOR DURING LOW SPEED ROLL RUN
IBC32           ROLL_MAG_SLOW:  DS  2           ;AVERAGE OF MAGNITUDE DURING LOW SPEED ROLL RUN
I
IBC34           ROLL_X_FAST:    DS  2           ;AVERAGE X VECTOR DURING HIGH SPEED ROLL RUN
IBC36           ROLL_Y_FAST:    DS  2           ;AVERAGE Y VECTOR DURING HIGH SPEED ROLL RUN
IBC38           ROLL_Z_FAST:    DS  2           ;AVERAGE Z VECTOR DURING HIGH SPEED ROLL RUN
IBC3A           ROLL_MAG_FAST:  DS  2           ;AVERAGE OF MAGNITUDE DURING HIGH SPEED ROLL RUN
I
IBC3C           PITCH_X_SLOW:   DS  2           ;AVERAGE X VECTOR DURING SLOW SPEED PITCH RUN
IBC3E           PITCH_Y_SLOW:   DS  2           ;AVERAGE Y VECTOR DURING SLOW SPEED PITCH RUN
IBC40           PITCH_Z_SLOW:   DS  2           ;AVERAGE Z VECTOR DURING SLOW SPEED PITCH RUN
IBC42           PITCH_MAG_SLOW: DS  2           ;AVERAGE OF MAGNITUDE DURING LOW SPEED PITCH RUN
I
IBC44           PITCH_X_FAST:   DS  2           ;AVERAGE X VECTOR DURING HIGH SPEED PITCH RUN
IBC46           PITCH_Y_FAST:   DS  2           ;AVERAGE Y VECTOR DURING HIGH SPEED PITCH RUN
IBC48           PITCH_Z_FAST:   DS  2           ;AVERAGE Z VECTOR DURING HIGH SPEED PITCH RUN
IBC4A           PITCH_MAG_FAST: DS  2           ;AVERAGE OF MAGNITUDE DURING HIGH SPEED PITCH RUN
I
IBC4C           X_AVG:          DS  4           ;ACCUMULATER FOR AVERAGING X VECTOR
IBC50           Y_AVG:          DS  4           ;ACCUMULATER FOR AVERAGING Y VECTOR
IBC54           Z_AVG:          DS  4           ;ACCUMULATER FOR AVERAGING Z VECTOR
IBC58           MAG_AVG:        DS  4           ;ACCUMULATER FOR AVERAGING MAGNITUDE
I
IBC5C           AVG_COUNT:      DS  2           ;NUMBER OF SAMPLES ACCUMULATED FOR AVERAGING
I
IBC5E           KEY_TIMER:      DS  1           ;TIMER FOR KEY-STROKE PROCESSING
IBC5F           KEY_FLAG:       DS  1           ;FLAG FOR KEY-STROKE PROCESSING
I
IBC60           TEMP_GRAV:      DS  2           ;ACCELERATION OF GRAVITY
```

```
1BC62           CHAN_NUM:       DS  2       ;ACCELERATION OF GRAVITY
1BC64           DUMP_PTR:       DS  2       ;DATA DUMP POINTER
;
;               INCLUDE RSEG.ASC            ;GET REGISTER ASSIGNMENTS
;
;               ;**************************************************
;               ; Filename:   RSEG.ASC
;               ; Updated :   11/14/86    gec
;               ;**************************************************
;
;               ;GENERAL PURPOSE REGISTER STORAGE
;
100A0                   ORG     0A0H
;
100A0           AYL:    DS  4               ;1,2
100A4           BYL:    DS  4               ;3,4
100A8           CYL:    DS  4               ;5,6
100AC           M11:    DS  2               ;7
100AE           M12:    DS  2               ;8
;
;               ;**************************************************
100B0           M13:    DS  2               ;9 (0B0H)
100B2           M21:    DS  2               ;10
100B4           M22:    DS  2               ;11
100B6           M23:    DS  2               ;12
100B8           M31:    DS  2               ;13
100BA           M32:    DS  2               ;14
100BC           M33:    DS  2               ;15
100BE           DY:     DS  2               ;16
;
;               ;**************************************************
100C0           EY:     DS  2               ;17 (0C0H)
100C2           FY:     DS  2               ;18
100C4           GY:     DS  2               ;19
100C6           HY:     DS  2               ;20
100C8           IY:     DS  2               ;21
100CA           JY:     DS  2               ;22
100CC           KY:     DS  2               ;23
100CE           LY:     DS  2               ;24
;
;               ;**************************************************
100D0           NY:     DS  2               ;25 (0D0H)
100D2           PY:     DS  2               ;26
100D4           QY:     DS  2               ;27
100D6           RY:     DS  2               ;28
;
100CA =         LOCAL_6 EQU     JY
100CC =         ROLL    EQU     KY
100CE =         PITCH   EQU     LY

;GARY'S REGISTER ASSIGNMENTS/LABELS/VALUE EQUATES

0080 =          MODE_SW         EQU 080H    ;
007A =          MODE_TASK       EQU 07AH    ;
00E0 =          AD_CH0          EQU 0E0H    ; X AXIS A/D CHANNEL
00E2 =          AD_CH1          EQU 0E2H    ; Y AXIS A/D CHANNEL
00E4 =          AD_CH2          EQU 0E4H    ; Z AXIS A/D CHANNEL
```

```
00E6 =          AD_CH3          EQU 0E6H        ; 2.5 VOLT REF.
00E8 =          AD_CH4          EQU 0E8H        ; VOLT REF. AGND TO VREF.
00EA =          AD_CH5          EQU 0EAH        ; BATTERY SENSE.
005A =          D_CNTRL         EQU 05AH        ; DISPLAY CONTROL BYTE.
8870 =          DMI1A           EQU 08870H      ; DOT MATRIX IMAGE BANK 1, PHASE A
88E0 =          DMI1B           EQU 088E0H      ;                       , PHASE B
89C0 =          DMI2A           EQU 089C0H      ;                  BANK 2, PHASE A
8A30 =          DMI2B           EQU 08A30H      ;                       , PHASE B

006C =          ICON_P          EQU 06CH        ;
0081 =          MP_SME_C        EQU 081H        ;
00A0 =          MP_TEMP         EQU 0A0H
008A =          PNTR_T          EQU 08AH        ; TEMPORARY TARGET POINTER.
008E =          PNTR_T1         EQU 08EH        ; TEMPORARY TARGET POINTER 1.
0088 =          PNTR_S          EQU 088H        ; TEMPORARY SOURCE POINTER.
008C =          PNTR_S1         EQU 08CH        ; TEMPORARY SOURCE POINTER 1.
0086 =          LCNT            EQU 086H        ; TEMPORARY COUNTER REGISTER.
005B =          SS_DC           EQU 05BH        ; SEVEN SEGMENT PUNCTUATION CONTROL BYTE.
8857 =          SWR             EQU 08857H      ; SWITCH JUST RECOGNIZED STATUS BYTE.
0086 =          SS_G            EQU 086H        ; LSD OF BCD G TABLE
008A =          SS_T            EQU 08AH        ; LSD OF BCD TIME TABLE
0084 =          TEMP            EQU 094H        ; TEMPORARY TEMPORARY REGISTER.

;LOCAL DEFINITIONS

00F0 =          CAL_MODE        EQU 0F0H        ;WORD
00F2 =          BIN_AG          EQU 0F2H        ;WORD
00F4 =          RUN_T           EQU 0F4H        ;WORD
00F6 =          CAL_N           EQU 0F6H        ;WORD
00F8 =          KEY_TIME        EQU 0F8H        ;WORD
0084 =          TEMP2           EQU TEMP        ;WORD

40E0 =          PNTR_COLLAPSE   EQU 40E0H
40E3 =          PNTR_EXPAND     EQU 40E3H
40E6 =          CLEAR_ALL       EQU 40E6H
40E9 =          CLEAR_DMI1      EQU 40E9H
40EC =          CLEAR_SSI1      EQU 40ECH
40EF =          LOAD_ICON_DMI1  EQU 40EFH
40F2 =          CLEAR_DIG       EQU 40F2H
40F5 =          LOAD_SSI1       EQU 40F5H
40F8 =          MP_STOP         EQU 40F8H
40FB =          MP_START_SCALE  EQU 40FBH

;CODE
                ;CONSTANTS

0096 =          U_BOUND         EQU 150 ;UPPER BOUND ON MANUAL ENTRY OF ANGLE GAIN (15.0)
FFCE =          L_BOUND         EQU -50 ;LOWER BOUND ON MANUAL ENTRY OF ANGLE GAIN (-5.0)
0041 =          ROLL_INIT       EQU 65  ;DEFAULT ROLL GAIN (6.5)
0015 =          PITCH_INIT      EQU 21  ;DEFAULT PITCH GAIN (2.1)
000A =          INT_1           EQU 10  ;FIRST KEY INTERVAL FOR MANUAL ROLL GAIN ENTRY
0003 =          INT_N           EQU 3   ;REPEAT KEY INTERVAL FOR MANUAL ROLL GAIN ENTRY
000A =          BLANK_CODE      EQU 0AH ;CODE TO PRODUCE BLANK 7-SEGMENT CHARACTER
0014 =          MINUS_CODE      EQU 20  ;CODE TO PRODUCE "-" IN 7-SEGMENT DISPLAY
```

```
        4100              ORG 4100H       ;CSEG AT 4500H

4100 E76F08             LJMP    PROCESS_OFFSET
   4103 E73B09             LJMP    PROCESS_SAMPLE_TRIAD1
   4106 E7EF04             LJMP    MP_STRT_CAL
   4109 E7C309             LJMP    ROT_MEM_INIT
   410C E71509             LJMP    ROT_PWR_UP
   410F E74902             LJMP    MAG_X_Y
   4112 E7A903             LJMP    BIN_TO_BCD3
   4115 E79003             LJMP    BIN_TO_TIME
   4118 E7E904             LJMP    MP_STRT_CAL1

I              INCLUDE ROTATE.ASC
  I
  I              INCLUDE SQRT.ASC            ;SET SQUARE ROOT ROUTINE
  I              ;***********************************************************
  I              ;SUBROUTINE: SQRT
  I              ;    INS: ARG (LONG WORD)
  I              ;    OUTS: RESULT
  I              ; DESTROYS: ARG,TEMP,COUNT
  I              ;    CALLS: NONE
  I              ; DESCRIPT: CALCULATES SQUARE ROOT USING NEWTON ITERATION BEGINNING WITH A
  I              ;           SEED VALUE ESTIMATED FROM THE MAGNITUDE OF THE INPUT
  I              ;***********************************************************
 I00A0 =         ARG     EQU AYL
 I00A4 =         RESULT  EQU BYL
 I00A8 =         TEMP3   EQU CYL
 I00D6 =         COUNT   EQU RY
  I
  I              SQRT:
  I
  I                      ;CLEAR RESULT IN CASE ARGUMENT IS 0
 I411B 01A4              CLR     RESULT
  I
  I                      ;GENERATE SEED VALUE
 I411D A0A2AA            LD      TEMP3+2,ARG+2   ;COPY ARG TO TEMP
 I4120 A0A0A8            LD      TEMP3,ARG       ;
 I4123 0FD6A8            NORML   TEMP3,COUNT     ;NORMALIZE TO DETERMINE ORDER OF MAGNITUDE
 I4126 DF27              JE      DONE            ;DONE IF ARGUMENT WAS 0
 I4128 1801D6            SHRB    COUNT,#1        ;ELSE, DIV BY 2
  I
 I412B A1FFFFA4          LD      RESULT,#0FFFFH  ;LOAD SEED
 I412F 08D6A4            SHR     RESULT,COUNT    ;SCALE SEED VALUE
  I
 I4132 B105D6            LDB     COUNT,#5        ;SET PASS COUNTER FOR NUMBER OF ITERATIONS
 I4135 A0A2AA   LOOP:    LD      TEMP3+2,ARG+2   ;COPY ARG TO TEMP3
 I4138 A0A0A8            LD      TEMP3,ARG       ;
 I413B 8CA4A8            DIVU    TEMP3,RESULT    ;DIVIDE
 I413E 01A6              CLR     RESULT+2        ;
 I4140 64A8A4            ADD     RESULT,TEMP3    ;
 I4143 A400A6            ADDC    RESULT+2,0      ;
 I4146 0C01A4            SHRL    RESULT,#1       ;X 0.5
 I4149 A400A4            ADDC    RESULT,0        ;ROUND UPWARD
 I414C E0D6E6            DJNZ    COUNT,LOOP      ;CONTINUE TILL DONE
 I414F F0       DONE:    RET                     ;RETURN FROM SQUARE ROOT ROUTINE
```

```
I               $PAGE
I               INCLUDE SINCOS.ASC          ;GET TRIG ROUTINES
I               ;NUMBERS ARE HANDLED IN THE FOLLOWING FORMAT USING 2'S COMP INTEGER ARITHMETIC:
I
I                    ;S-D14-D13.D12-D11-------D1-D0    1.0 --> 2**13 = 2000H
I
I
I               ;****************************************************************
I               ;SUBROUTINE: SINCOS
I               ;     INS: WORD AT ARG (RADIANS)
I               ;    OUTS: SIN OUTPUT WORD AT SIN
I               ;          COS OUTPUT WORD AT COS
I               ; DESTROYS: TEMP1
I               ;    CALLS: NONE
I               ; DESCRIPT: APPROXIMATIONS: COS(X)=1-(X**2)/2   ERROR IS LESS THAN (X**4)/24
I               ;                          SIN(X)= X-(X**3)/6   ERROR IS LESS THAN (X**5)/120
I               ;****************************************************************
I
I               SINCOS:
I
I00BE =         SIN     EQU     DY
I00C0 =         COS     EQU     EY
I00A4 =         TEMP1   EQU     BYL
I
I                       ;GENERATE (X**2)/2
14150 FE4CA0A0         MUL     TEMP1,ARG,ARG   ;X**2
-4154 A4
14155 0E0EA4           SHRAL   TEMP1,#14       ;RESTORE MAGNITUDE * 0.5 = (X**2)/2
14158 A10020C0         LD      COS,#2000H      ;CALCULATE 1-(X**2)/2
1415C 68A4C0           SUB     COS,TEMP1       ;
1415F FE6CA0A4         MUL     TEMP1,ARG       ;CALCULATE X**3
14163 FE8D0060         DIV     TEMP1,#6000H    ;RESTORE MAGNITUDE/3 ---> (X**3)/6
-4167 A4
14168 A0A0BE           LD      SIN,ARG         ;LOAD FIRST TERM
1416B 68A4BE           SUB     SIN,TEMP1       ;SUB SECOND TERM
1416E F0               RET                     ;RETURN FROM SINCOS
I
I               ;****************************************************************
I               ;SUBROUTINE: ARCSIN
I               ;     INS: WORD AT ARG
I               ;    OUTS: OUTPUT WORD AT A_SIN (RADIANS)
I               ; DESTROYS: TEMP1
I               ;    CALLS: NONE
I               ; DESCRIPT: APPROXIMATIONS: ARCSIN(X)=1+(X**3)/6   NEXT TERM 3(X**5)/40
I               ;****************************************************************
I
I               ARCSIN:
I
I00BE =         A_SIN   SET     DY
I
I                       ;GENERATE (X**2)/2
1416F FE4CA0A0         MUL     TEMP1,ARG,ARG   ;X**2
-4173 A4
14174 0E0EA4           SHRAL   TEMP1,#14       ;RESTORE MAGNITUDE (X**2)/2
14177 FE6CA0A4         MUL     TEMP1,ARG       ;CALCULATE (X**3)/2
1417B FE8D0060         DIV     TEMP1,#06000H   ;RESTORE MAGNITUDE/3 ---> (X**3)/6
-417F A4
```

```
14180 A0A0BE              LD      A_SIN,ARG       ;LOAD FIRST TERM
14183 64A4BE              ADD     A_SIN,TEMP1     ;ADD SECOND TERM
14186 F0                  RET                     ;RETURN FROM ARCSIN
I             $PAGE
I             ;****************************************************************
I             ;SUBROUTINE: ARCTAN
I             ;     INS:  WORD AT ARG
I             ;     OUTS: WORD AT A_TAN (RADIANS)
I             ; DESTROYS: TEMP1,TEMP,ARG
I             ;    CALLS: INVTAN
I             ; DESCRIPT: THE INPUT ARGUMENT IS TESTED FOR RESULTS EXCEEDING
I             ;           PI/8 (22.5 DEGREES) IN MAGNITUDE.  FOR POSITIVE RESULTS EXCEEDING
I             ;           PI/8, THE RELATIONSHIP TAN(ARG) = TAN(X+PI/8)= (1+TAN(X))/(1-TAN(X))
I             ;           IS USED TO REDUCE THE ARGUMENT MAGNITUDE SO THAT A TUNCATED SERIES
I             ;           WILL BETTER APPROXIMATE THE ARCTAN FUNCTION.  IN THIS CASE,
I             ;           TAN(X)= (ARG-1)/(ARG+1).
I             ;           HENCE, ATAN (ARG)= ATAN((ARG-1)/(ARG+1))+PI/8
I             ;           A SIMILAR RELATIONSHIP IS USED FOR NEGATIVE ANGLES.
I             ;
I             ;****************************************************************
I
I             ARCTAN:
I
100BE =       A_TAN           EQU     DY
10D41 =       TAN_PI_OVR_8    EQU     3393    ;TAN(PI/8)*2000H
11922 =       PI_OVR_4        EQU     6434    ;PI/4 *2000H
I
I
14187 89410DA0            CMP     ARG,#TAN_PI_OVR_8    ;COMPARE WITH TAN(PI/8)
1418B D227                JGT     ANG_GT          ;JUMP IF ANGLE > PI/8
1418D 89BFF2A0            CMP     ARG,#-TAN_PI_OVR_8   ;COMPARE WITH TAN(-PI/8)
14191 DE03                JLT     ANG_LT          ;JUMP IF ANGLE < PI/8
14193 283D                SCALL   INVTAN          ;ELSE, MAGNITUDE OF ANGLE < PI/8. COMPUTE ATAN
14195 F0                  RET                     ;RETURN FROM ARCTAN
I
I                         ;COMPUTE (1+ARG)/(1-ARG)
14196 A10020A4  ANG_LT:   LD      TEMP1,#2000H    ;COMPUTE 1-ARG
1419A 68A0A4              SUB     TEMP1,ARG       ;
1419D 650020A0            ADD     ARG,#2000H      ;COMPUTE 1+ARG
141A1 A0A0A2              LD      ARG+2,ARG       ;PREPARE DIVIDEND
141A4 01A0                CLR     ARG             ;
141A6 0E03A0              SHRAL   ARG,#3          ;
141A9 FEBCA4A0            DIV     ARG,TEMP1       ;DIVIDE (1+ARG)/(1-ARG)
141AD 2823                SCALL   INVTAN          ;COMPUTE ARCTAN OF REDUCED ARGUMENT
141AF 692219BE            SUB     A_TAN,#PI_OVR_4 ;SUBTRACT PI/4 DIFFERENCE ANGLE
141B3 F0                  RET                     ;RETURN FROM ARCTAN
I
I                         ;COMPUTE (ARG-1)/(ARG+1)
141B4 A0A0A4  ANG_GT:     LD      TEMP1,ARG       ;COMPUTE ARG+1
141B7 650020A4            ADD     TEMP1,#2000H    ;
141BB 690020A0            SUB     ARG,#2000H      ;COMPUTE ARG-1
141BF A0A0A2              LD      ARG+2,ARG       ;PREPARE DIVIDEND
141C2 01A0                CLR     ARG             ;
141C4 0E03A0              SHRAL   ARG,#3          ;
141C7 FEBCA4A0            DIV     ARG,TEMP1       ;DIVIDE (ARG-1)/(ARG+1)
141CB 2805                SCALL   INVTAN          ;
141CD 652219BE            ADD     A_TAN,#PI_OVR_4 ;
141D1 F0                  RET                     ;RETURN FROM ARCTAN
```

```
I               $PAGE
I               ;###############################################################
I               ;SUBROUTINE: INVTAN
I               ;     INS:  WORD AT ARG
I               ;     OUTS: OUTPUT WORD AT A_TAN
I               ; DESTROYS: TEMP1
I               ;    CALLS: NONE
I               ; DESCRIPT: APPROXIMATIONS:  ARCTAN(X)=X-(X**3)/3   NEXT TERM +(X**5)/5
I               ;###############################################################
I
I               INVTAN:
I
I                         ;GENERATE (X**2)/2
14102 FE4CA0A0            MUL    TEMP1,ARG,ARG  ;X**2
-41D6 A4
141D7 0E0DA4              SHRAL  TEMP1,#13      ;RESTORE MAGNITUDE  (X**2)
141DA FE6CA0A4            MUL    TEMP1,ARG      ;CALCULATE (X**3)
141DE FE8D0060            DIV    TEMP1,#06000H  ;RESTORE MAGNITUDE/3 ---> (X**3)/3
-41E2 A4
141E3 A0A0BE              LD     A_TAN,ARG      ;LOAD FIRST TERM
141E6 68A4BE              SUB    A_TAN,TEMP1    ;ADD SECOND TERM
141E9 F0                  RET                   ;RETURN FROM INVTAN

I               $PAGE
I
I               INCLUDE MATMUL.ASC          ;GET MATRIX ARITHMETIC ROUTINES
I               ;###############################################################
I               ;SUBROUTINE: MAT_VECT3
I               ;     INS:  3 ELEMENT WORD VECTOR AT X_IN
I               ;           3X3 WORD MATRIX AT M11, ORDERED ROW1,ROW2,ROW3
I               ;     OUTS: 3 ELEMENT WORD VECTOR AT X_OUT
I               ; DESTROYS: MAT_PTR,VECT_IN_PTR,VECT_OUT_PTR,ROW_INDEX,COL_INDEX,MUL_RES,
I               ;           SUM_PROD
I               ;    CALLS: NONE
I               ; DESCRIPT:
I               ;###############################################################
I               ;          GENERAL REGISTER EQUATES
I               ;
1O0BE =         X_OUT   EQU DY         ;X VECTOR OUTPUT
1O0C0 =         Y_OUT   EQU EY         ;Y VECTOR OUT
1O0C2 =         Z_OUT   EQU FY         ;Z VECTOR OUT
I
1O0E0 =         X_IN    EQU AD_CH0     ;X VECTOR IN
1O0E2 =         Y_IN    EQU AD_CH1     ;Y VECTOR IN
1O0E4 =         Z_IN    EQU AD_CH2     ;Z VECTOR IN
I
1O0A0 =         MUL_RES     EQU AYL ;LONG WORD RESULT OF MATRIX ELEMENT*INPUT ELEMENT
1O0A4 =         SUM_PROD    EQU BYL ;SUM OF PRODUCTS OF MATRIX MULTIPLICATION
1O0D4 =         VECT_IN     EQU QY  ;INPUT VECTOR OPERAND DURING MULTIPLICATIONS
1O0CA =         VECT_IN_PTR EQU JY  ;POINTER TO INPUT VECTOR ELEMENT
1O0CC =         VECT_OUT_PTR EQU KY ;POINTER TO OUTPUT VECTOR ELEMENT
1O0CE =         MAT_PTR     EQU LY  ;POINTER TO MATRIX ELEMENTS
1O0D0 =         COL_INDEX   EQU NY  ;COLUMN INDEX COUNTER
1O0D2 =         ROW_INDEX   EQU PY  ;ROW INDEX COUNTER
I               ;###############################################################
I               MAT_VECT3:    ;SUBROUTINE TO PERFORM MATRIX MULTIPLICATION [3X3][1X3]
I                    ;INPUTS: 3 ELEMENT WORD VECTOR AT X_IN
```

```
I                        ;        3X3 WORD MATRIX AT M11, ORDERED WITH COLUMNS AS SHOWN
I                        ;OUTPUTS: 3 ELEMENT WORD VECTOR AT X_OUT
I
141EA A1ACD0CE           LD      MAT_PTR,#M11            ;LOAD POINTER TO MATRIX ELEMENTS
141EE A1BE90CC           LD      VECT_OUT_PTR,#X_OUT     ;LOAD POINTER TO OUTPUT VECTOR
141F2 B103D2             LDB     ROW_INDEX,#3            ;LOAD COUNTER FOR 3 ROWS
I
141F5 B103D0    ROWL:    LDB     COL_INDEX,#3            ;LOAD COUNTER FOR 3 COLUMNS
141F8 A1E000CA           LD      VECT_IN_PTR,#X_IN       ;LOAD POINTER TO INPUT VECTOR
141FC 01A4               CLR     SUM_PROD                ;CLEAR SUM OF PRODUCTS
141FE 01A6               CLR     SUM_PROD+2              ;
I
14200 A2C8A0    COWL:    LD      MUL_RES,[VECT_IN_PTR]+  ;LOAD VECTOR INPUT OPERAND
14203 FE6ECFA0           MUL     MUL_RES,[MAT_PTR]+      ;MULTIPLY ELEMENT
14207 64A0A4             ADD     SUM_PROD,MUL_RES        ;ADD LOW WORD OF RESULT
1420A A4A2A6             ADDC    SUM_PROD+2,MUL_RES+2    ;ADD HIGH WORD OF RESULT
1420D E0D0F0             DJNZ    COL_INDEX,COWL          ;REPEAT TIL EACH ROW MULTIPLY DONE
14210 0E0DA4             SHRAL   SUM_PROD,#13            ;NORMALIZE RESULT
14213 C2CDA4             ST      SUM_PROD,[VECT_OUT_PTR]+;STORE RESULT
14216 E0D28C             DJNZ    ROW_INDEX,ROWL          ;REPEAT INNER LOOP TILL ALL ROWS DONE
I
14219 F0                 RET                             ;RETURN FROM MAT_MUL
I               $PAGE
I               ;*************************************************************
I               ;SUBROUTINE: MAT_MAT
I               ;    INS: 3X3 WORD MATRIX [A]
I               ;         A_PTR = POINTER TO MATRIX [A]
I               ;         3X3 WORD MATRIX [B], MUST LIE WITHIN REGISTER SPACE
I               ;         B_PTR = POINTER TO MATRIX [B]
I               ;         C_PTR = POINTER TO OUTPUT MATRIX [C]
I               ;   OUTS: 3X3 WORD MATRIX [C]
I               ; DESTROYS: ROW_INDEX,COL_INDEX,CPL_INDEX,SUM_PROD,MUL_RES,A_PTR,B_PTR,C_PTR
I               ;    CALLS: NONE
I               ; DESCRIPT: PERFORMS MATRIX MULTIPLY [3X3][3X3] [C]=[B][A]
I               ;*************************************************************
I               ;        GENERAL REGISTER EQUATES
I00D6 =         CPL_INDEX        EQU RY
I00CA =         A_PTR            EQU JY
I00CE =         B_PTR            EQU LY
I00CC =         C_PTR            EQU KY
I               ;*************************************************************
I               MAT_MAT:
1421A B103D2             LDB     ROW_INDEX,#3            ;LOAD COUNTER FOR 3 ROWS
I
1421D B103D0    ROWL1:   LDB     COL_INDEX,#3            ;LOAD COUNTER FOR 3 COLUMNS
14220 01A4      COL1:    CLR     SUM_PROD                ;CLEAR SUM OF PRODUCTS
14222 01A6               CLR     SUM_PROD+2              ;
I
14224 B103D6             LDB     CPL_INDEX,#3            ;LOAD COUNTER FOR 3 PRODUCTS/ELEMENT
I               CPL:     ;SUM OF PRODUCS LOOP TO CALCULATE EACH ELEMENT IN [C]
14227 A2CAA0             LD      MUL_RES,[A_PTR]         ;LOAD VECTOR INPUT OPERAND
1422A FE6ECFA0           MUL     MUL_RES,[B_PTR]+        ;MULTIPLY ELEMENT
1422E 64A0A4             ADD     SUM_PROD,MUL_RES        ;ADD LOW WORD OF RESULT
14231 A4A2A6             ADDC    SUM_PROD+2,MUL_RES+2    ;ADD HIGH WORD OF RESULT
14234 650600CA           ADD     A_PTR,#6                ;BUMP POINTER TO NEXT ROW DOWN (+3 WORDS)
14238 E0D6EC             DJNZ    CPL_INDEX,CPL           ;REPEAT TIL EACH ROW MULTIPLY DONE
1423B 0E0DA4             SHRAL   SUM_PROD,#13            ;NORMALIZE RESULT
```

```
1423E C2CDA4            ST      SUM_PROD,[C_PTR]+       ;STORE RESULT
14241 690600CE          SUB     B_PTR,#6                ;POINT TO BEGINNING OF ROW (-3 WORDS)
14245 691000CA          SUB     A_PTR,#16               ;POINT TO BEGINNING OF NEXT COL (-8 )
;
14249 E0D0D4            DJNZ    COL_INDEX,COL1          ;REPEAT INNER LOOP ALL ELEMENTS IN ROW
1424C 650600CE          ADD     B_PTR,#6                ;POINT TO BEGINNING OF NEXT ROW (+3)
14250 690600CA          SUB     A_PTR,#6                ;POINT TO BEGINNING OF NEXT COLUMN (+3)
;
14254 E0D2C6            DJNZ    ROW_INDEX,ROWL1         ;REPEAT OUTER LOOP FOR 3 ROWS
;
14257 F0               RET                              ;RETURN FROM MAT_MAT

;                       $PAGE
;***********************************************************************
;       SUBROUTINE: VECT_TO_XYZ
;            INS:   SOURCE = ADDRESS AT BOTTOM OF ARRAY (WORD)
;           OUTS:   VECTOR AT X_IN,Y_IN,Z_IN
;       DESTROYS:   VECT_IN,SOURCE,DEST,COUNT
;          CALLS:   NONE
;       DESCRIPT:   COPIES 3-WORD VECTOR TO X_IN
;***********************************************************************
                        VECT_TO_XYZ:

14258 A1E000CC          LD      DEST,#X_IN              ;LOAD DESTINATION
1425C B103D6            LDB     COUNT,#3                ;COPY 3 WORD VECTOR
1425F 2000              SJMP    COPY                    ;JUMP TO COMPLETE TRANSFER

;***********************************************************************
;       SUBROUTINE: COPY
;            INS:   SOURCE = ADDRESS AT BOTTOM OF ARRAY (WORD)
;                   DEST   = ADDRESS AT BOTTOM OF ARRAY (WORD)
;                   COUNT  = NUMBER OF WORDS TO BE COPIED (BYTE)
;           OUTS:   DUPLICATE AT DEST
;       DESTROYS:   VECT_IN,SOURCE,DEST,COUNT
;          CALLS:   NONE
;       DESCRIPT:   COPIES WORD ARRAY BETWEEN REGISTERS AND RAM
;***********************************************************************
;                       GENERAL REGISTER EQUATES
100CA =                 SOURCE  EQU     JY
100CC =                 DEST    EQU     KY
;***********************************************************************
                        COPY:
14261 A2CBD4            COPY_L: LD      VECT_IN,[SOURCE]+       ;GET SOURCE WORD
14264 C2CDD4                    ST      VECT_IN,[DEST]+         ;TRANSFER WORD
14267 E0D6F7                    DJNZ    COUNT,COPY_L            ;REPEAT TILL DONE
1426A F0                        RET                             ;RETURN FROM COPY_L

;***********************************************************************
;       SUBROUTINE: COPYB
;            INS:   SOURCE = ADDRESS AT BOTTOM OF ARRAY (WORD)
;                   DEST   = ADDRESS AT BOTTOM OF ARRAY (WORD)
;                   COUNT  = NUMBER OF WORDS TO BE COPIED (BYTE)
;           OUTS:   DUPLICATE AT DEST
;       DESTROYS:   VECT_IN,SOURCE,DEST,COUNT
;          CALLS:   NONE
;       DESCRIPT:   COPIES BYTE ARRAY BETWEEN REGISTERS AND RAM
;***********************************************************************
```

```
I            COPYB:
14268 B2CBD4 COPYB_L:       LDB     VECT_IN,[SOURCE]+      ;GET SOURCE WORD
1426E C6CDD4                STB     VECT_IN,[DEST]+        ;TRANSFER WORD
14271 E0D6F7                DJNZ    COUNT,COPYB_L          ;REPEAT TILL DONE
14274 F0                    RET                            ;RETURN FROM COPYB_L
I            $PAGE
I            ;********************************************************************
I            ;SUBROUTINE: PROCESS_SAMPLE_TRIAD
I            ;      INS: X_IN,Y_IN,Z_IN
I            ;     OUTS: X_IN=X_OUT,Y_IN=Y_OUT,Z_IN=Z_OUT
I            ; DESTROYS: SOURCE,DEST,VECT_IN,MAT_PTR,VECT_OUT_PTR,ROW_INDEC,COL_INDEX,
I            ;           MUL_RES,SUM_PROD,TEMP1,ARG,VECT_IN_PTR,COUNT
I            ;    CALLS: ROTATE_TO_LEVEL,CALC_PITCH_ROLL_MATRIX,ROTATE_VECT,SCALE_CLIP
I            ; DESCRIPT:
I            ;           1. PROCESS INPUT OFFSET & SET FLAGS FOR CHANNELS IN CLIPPING
I            ;           2. COPY COMPOSITE ROTATION MATRIX TO REGISTER SPACE
I            ;           3. CALCULATE BODY ALIGNED VECTORS
I            ;           4. CALCULATE ACCEL INDUCED PITCH & ROLL ANGLES
I            ;              AND THEIR RESPECTIVE SINES & COSINES
I            ;           5. CALCULATE BODY PITCH & ROLL CORRECTION MATRIX
I            ;           6. CALCULATE PLANE OF ROAD ACCELERATION VECTORS
I            ;           7. SCALE & CLIP RESULTS TO 9-BIT 2'S COMP NUMBERS
I            ;           8. SET OUTPUTS IN CLIPPING IN COMPLIANCE WITH CLIPPING FLAGS
I            ;           9. RETURN
I            ;********************************************************************

I            PROCESS_SAMPLE_TRIAD:           ;PROCESS ACCELELEROMETER INPUTS

I                        ;PROCESS INPUT OFFSET & SET FLAGS FOR CHANNELS IN CLIPPING
14275 EFFA06             LCALL   PROCESS_OFFSET

I                        ;CALCULATE BODY ALIGNED VECTORS
14278 2906               SCALL   ROTATE_TO_LEVEL

I                        ;CALCULATE ACCELERATION INDUCED PITCH & ROLL ANGLES
I                        IF 0
I                        MUL     TEMP,Y_IN,PITCH_GAIN    ;CALCULATE PITCH ANGLE
I                        DIV     TEMP,#1600              ;DIVIDE BY 1 G
I
I                        MUL     ARG,X_IN,ROLL_GAIN      ;CALCULATE ROLL ANGLE
I                        DIV     ARG,#1600               ;DIVIDE BY 1 G
I                        ENDIF

I                        ;ESTIMATE PITCH ANGLE: PITCH=Y_IN/G*PITCH_GAIN/(1+Z_IN*PITCH_GAIN/G)
I
1427A FE4F011E           MUL     TEMP1,Z_IN,PITCH_GAIN
-427E BCE4A4
14281 FE8D4006           DIV     TEMP1,#1600             ;DIVIDE BY 1 G
-4285 A4
14286 650020A4           ADD     TEMP1,#2000H            ;ADD 1 (SCALED)
1428A FE4F011E           MUL     TEMP,Y_IN,PITCH_GAIN    ;
-428E BCE284
14291 FE8D4006           DIV     TEMP,#1600              ;DIVIDE BY 1 G
-4295 84
14296 A08486             LD      TEMP+2,TEMP             ;PREPARE FOR DIVISION
14299 01E4               CLR     TEMP                    ;
```

```
1429B 0E0384          SHRAL  TEMP,#3         ;
1429E FEBCA484        DIV    TEMP,TEMP1      ;
|
|                     ;ESTIMATE ROLL ANGLE: ROLL=X_IN/6*ROLL_GAIN/(1+Z_IN*ROLL_GAIN/6)
|
142A2 FE4F011C        MUL    TEMP1,Z_IN,ROLL_GAIN
-42A6 BCE4A4
142A9 FE8D4006        DIV    TEMP1,#1600     ;DIVIDE BY 1 6
-42AD A4
142AE 650020A4        ADD    TEMP1,#2000H    ;ADD 1 (SCALED)
142B2 FE4F011C        MUL    ARG,X_IN,ROLL_GAIN ;
-42B6 BCE0A0
142B9 FE8D4006        DIV    ARG,#1600       ;DIVIDE BY 1 6
-42BD A0
142BE A0A0A2          LD     ARG+2,ARG       ;PREPARE FOR DIVISION
142C1 01A0            CLR    ARG             ;
142C3 0E03A0          SHRAL  ARG,#3          ;
142C6 FEBCA4A0        DIV    ARG,TEMP1       ;
|
|                     ;CALCULATE BODY PITCH & ROLL CORRECTION MATRIX
142CA 2848            SCALL  CALC_PITCH_ROLL_MATRIX
|
|                     ;CALCULATE PLANE OF ROAD ACCELERATION VECTORS
142CC 289C            SCALL  ROTATE_VECT     ;
|
142CE 2925            SCALL  MAG2            ;CALCULATE RESULTANT OF X & Y
142D0 0A04A4          SHRA   RESULT,#4       ;ADJUST THE RESULTANT
|
|                     ;SCALE & CLIP X_OUT & Y_OUT TO 9-BIT 2'S COMP NUMBERS
|
142D3 A1BE00CA        LD     A_PTR,#X_OUT    ;ADJUST THE X VECTOR
142D7 2806            SCALL  SCALE_CLIP      ;
|
|                     ;LD    A_PTR,#Y_IN     ;ADJUST THE Y VECTOR
142D9 2804            SCALL  SCALE_CLIP      ;
|
|                     ;SET OUTPUTS IN CLIPPING IN COMPLIANCE WITH CLIPPING FLAGS
142DB EFCF06          LCALL  OUT_CLIP
|
142DE F0              RET                    ;RETURN FROM PROCESS_SAMPLE TRIAD

|       $PAGE
|       ;******************************************************************
|       ;SUBROUTINE: SCALE_CLIP
|       ;     INS:  A_PTR = POINTER TO RESULT INPUT
|       ;     OUTS: ADJUSTED OUTPUT @ A_PTR
|       ;           A_PTR=A_PTR+2
|       ; DESTROYS: VECT_IN
|       ;    CALLS: NONE
|       ; DESCRIPT: SCALE & CLIP RESULTS TO 9-BIT 2'S COMP NUMBERS
|       ;******************************************************************
|
|       SCALE_CLIP:
|
142DF A2CAD4          LD     VECT_IN,[A_PTR] ;GET INPUT
142E2 0A04D4          SHRA   VECT_IN,#4      ;SCALE TO 9 BIT NUMBER
142E5 A400D4          ADDC   VECT_IN,0       ;ROUND RESULT
```

```
142EB 89FF00D4          CMP     VECT_IN,#0FFH       ;TEST IF RESULT > 00FF
142EC D208              JGT     CLIP_HI             ;JUMP IF >
142EE 8900FFD4          CMP     VECT_IN,#0FF00H     ;TEST IF RESULT < 0FF00
142F2 DE08              JLT     CLIP_LO             ;JUMP IF <
142F4 200A              SJMP    ST_OUT              ;JUMP TO STORE OUTPUT
;
142F6 A1FF00D4 CLIP_HI: LD      VECT_IN,#0FFH       ;SET OUTPUT TO UPPER BOUND
142FA 2004              SJMP    ST_OUT              ;JUMP TO STORE OUTPUT
;
142FC A100FFD4 CLIP_LO: LD      VECT_IN,#0FF00H     ;SET OUPUT TO LOWER BOUND
;
14300 C2CBD4   ST_OUT:  ST      VECT_IN,[A_PTR]+    ;STORE OUTPUT @ A_PTR
14303 F0                RET                         ; & RETURN FROM SCALE_CLIP
```

;************************************************************************
;SUBROUTINE: AVERAGE
;     INS:   A_PTR = POINTER TO RUNNING AVERAGE
;            ARG = CURRENT INPUT
;     OUTS:  UPDATED AVERAGE @ A_PTR
; DESTROYS: TEMP
;    CALLS: NONE
; DESCRIPT: UPDATE RUNNING AVERAGE.  USES AVG = AVG + (AVG-ARG)/2**3
;************************************************************************

AVERAGE:

```
14304 A2CA84            LD      TEMP,[A_PTR]
14307 6BA084            SUB     TEMP,ARG
1430A 0A0384            SHRA    TEMP,#3
1430D 66CA84            ADD     TEMP,[A_PTR]
14310 C2CA84            ST      TEMP,[A_PTR]
14313 F0                RET                         ;RETURN FROM AVERAGE
```

$PAGE
;************************************************************************
;SUBROUTINE: CALC_PITCH_ROLL_MATRIX
;     INS:   ARG = ROLL ANGLE (RADIANS)
;            TEMP = PITCH ANGLE (RADIANS)
;     CALLS: SINCOS
;     OUTS:  ROTATION MATRIX DEFINED BELOW:
; DESTROYS: TEMP1,ARG
;    CALLS: SINCOS
; DESCRIPT:
;[PITCH]*[ROLL](T) =   COS(R)          -SIN(P)SIN(R)       -COS(P)SIN(R)
;                      0                COS(P)             -SIN(P)
;                      SIN(R)           SIN(P)COS(R)        COS(P)COS(R)
;
;WHERE P= PITCH & R= ROLL (SEE DYNAMIC CORRECTIONS ANAL 4-25-86)
;************************************************************************

CALC_PITCH_ROLL_MATRIX:

```
14314 2E3A              SCALL   SINCOS              ;CALCULATE SINE & COSINE OF ROLL ANGLE
14316 A0BEB8            LD      M31,SIN             ;SAVE SINE(ROLL)
14319 A0C0AC            LD      M11,COS             ;SAVE COS(ROLL)

1431C A084A0            LD      ARG,TEMP            ;COPY PITCH ANGLE TO INPUT TO SINCOS ROUTINE
```

```
1431F 2E2F              SCALL   SINCOS          ;CALCULATE SINE & COSINE OF PITCH ANGLE
14321 A0BEB6            LD      M23,SIN         ;SAVE SINE(PITCH)
14324 A0C0B4            LD      M22,COS         ;SAVE COS(PITCH)
;
14327 FE4CACB4          MUL     ARG,M22,M11     ;CALCULATE COS(P)COS(R)
-432B A0
1432C 0E0DA0            SHRAL   ARG,#13         ;NORMALIZE PRODUCT
1432F A0A0BC            LD      M33,ARG         ;SAVE RESULT
;
14332 FE4CACB6          MUL     ARG,M23,M11     ;CALCULATE SIN(P)COS(R)
-4336 A0
14337 0E0DA0            SHRAL   ARG,#13         ;NORMALIZE PRODUCT
1433A A0A0BA            LD      M32,ARG         ;SAVE RESULT
;
1433D FE4CB8B4          MUL     ARG,M22,M31     ;CALCULATE COS(P)SIN(R)
-4341 A0
14342 0E0DA0            SHRAL   ARG,#13         ;NORMALIZE PRODUCT
14345 A0A0B0            LD      M13,ARG         ;SAVE RESULT
;
14348 03B0              NEG     M13             ;CONVERT COS(P)SIN(R) TO NEGATIVE
;
1434A 03B6              NEG     M23             ;CONVERT SIN(P) TO NEGATIVE
;
1434C FE4CB8B6          MUL     ARG,M23,M31     ;CALCULATE -SIN(P)SIN(R)
-4350 A0
14351 0E0DA0            SHRAL   ARG,#13         ;NORMALIZE PRODUCT
14354 A0A0AE            LD      M12,ARG         ;SAVE RESULT
;
14357 A000B2            LD      M21,0           ;LOAD 0 ELEMENT
;
1435A F0                RET                     ;RETURN FROM CALC_PITCH_ROLL_MATRIX
;               $PAGE
;               ;**************************************************************
;               ;SUBROUTINE: MAG_X_Y
;               ;   INS:  X_IN,Y_IN (9BIT 2'S COMP FORMAT)
;               ;   OUTS: RESULT
;               ; DESTROYS: X_IN,Y_IN,COUNT,A_PTR,ARG,TEMP
;               ;   CALLS: MAG2
;               ; DESCRIPT: CALCULATE THE RESULTANT OF X & Y (9-BIT 2'S COMP FORMAT)
;               ;**************************************************************
;
;               MAG_X_Y:
;
1435B 0904E0            SHL     X_IN,#4         ;SHIFT WORDS TO ENSURE PRECISION IN MAG2
1435E 0904E2            SHL     Y_IN,#4         ;
14361 2892              SCALL   MAG2            ;CALCULATE RESULTANT OF X & Y
14363 0A04A4            SHRA    RESULT,#4       ;SCALE RESULT TO ORIGINAL
14366 A400A4            ADDC    RESULT,0        ;ROUND UPWARD
14369 F0                RET                     ;RETURN FROM MAG_X_Y
;               $PAGE
;               IF 0    ;DISABLE ASSEMBLY
;
;                       LD      A_PTR,#CAL12_TAB  ;POINT TO CAL12 MODE TABLE
;                       SCALL   SEARCH_CAL_N      ;SEARCH TABLE
;                       JE      C12               ;IF CAL_MODE 1 OR 2, JUMP
```

```
                ;TEST IF CAL_MODE 4,5,8 OR 9 IS ACTIVE
        LD      A_PTR,#CAL4589_TAB      ;POINT TO CAL12 MODE TABLE
        SCALL   SEARCH_CAL_N            ;SEARCH TABLE
        JE      PST_R   ;IF CAL_MODE 4,5,8 OR 9, RETURN WITH BODY ALIGNED DATA

C12:    ;CORRECT INPUT AXIS MIS_ALIGNMENT & RETURN
        ;COPY INPUT AXIS CORRECTION ROTATION MATRIX TO REGISTER SPACE
        LD      SOURCE,#IA_M    ;POINT TO INPUT AXIS CORRECTION MATRIX IN RAM
        SCALL   MATRIX_TO_REGS ;

;CALCULATE INSTRUMENT CASE ALIGNED VECTORS
        SCALL   ROTATE_VECT     ;ROTATE INPUT VECTORS TO INSTRUMENT CASE
        RET                     ;RETURN FROM PROCESS_SAMPLE_TRIAD WITH UN-LEVELED DATA

;***************************************************************************
;SUBROUTINE:    SEARCH_CAL_N
;       INS:    A_PTR = POINTER TO TABLE OF CAL_N MODES TO BE RECOGNIZED (BYTES)
;               TABLE OF MODES IN DESCENDING MAGNITUDE AT HIGHER ADDRESS.
;               FINAL ENTRY MUST BE 0.
;       OUTS:   Z FLAG = 1 IF CAL_N IS LISTED IN TABLE
; DESTROYS:     A_PTR
;   CALLS:      NONE
; DESCRIPT:
;***************************************************************************

SEARCH_CAL_N:

CMPB    CAL_N,[A_PTR]+  ;COMPARE CAL_N WITH TABLE ENTRY
        JE      SEARCH_RET      ;IF CAL_N FOUND, RETURN
        JLT     SEARCH_CAL_N    ;CONTINUE TIL TABLE ENTRY IS LESS THAN CAL_N
SEARCH_RET:     RET

CAL12_TAB:      DB      2
                DB      1
                DB      0

CAL4589_TAB:    DB      9
                DB      8
                DB      5
                DB      4
                DB      0

ENDIF $PAGE
;***************************************************************************
;SUBROUTINE:    ROTATE_VECT
;       INS:    X_IN,Y_IN,Z_IN
;       OUTS:   X_IN=X_OUT, Y_IN=Y_OUT, Z_IN=Z_OUT
; DESTROYS:     MAT_PTR,VECT_OUT_PTR,ROW_INDEX,COL_INDEX,MUL_RES,SUM_PROD,
;               VECT_IN_PTR
;   CALLS:      MAT_VECT3
; DESCRIPT:-
;***************************************************************************

ROTATE_VECT:
```

```
14368 2E7E        SCALL    MAT_VECT3      ;ROTATE INPUT VECTORS TO BODY AXIS
1436C A0BEE0      LD       X_IN,X_OUT     ;COPY OUTPUT TO INPUT IN ANTICIPATION OF
1436F A0C0E2      LD       Y_IN,Y_OUT     ; ANOTHER ROTATION
14372 A0C2E4      LD       Z_IN,Z_OUT     ;
14375 F0          RET                     ;RETURN FROM ROTATE_VECT
```

;****************************************************************************
;SUBROUTINE: MATRIX_TO_REGS
;       INS: SOURCE = POINTER TO MATRIX
;      OUTS: 3X3 MATRIX COPIED AT M11
;  DESTROYS: SOURCE, DEST, COUNT, VECT_IN
;     CALLS: COPY
;  DESCRIPT:
;****************************************************************************

MATRIX_TO_REGS:

```
14376 A1AC00CC    LD       DEST,#M11      ;LOAD POINTER TO DESTINATION IN REGISTER SPACE
1437A B10906      LDB      COUNT,#9       ;COPY 3X3 MATRIX
1437D 2EE2        SCALL    COPY           ;
1437F F0          RET
```

;****************************************************************************
;SUBROUTINE: ROTATE_TO_LEVEL
;       INS: X_IN,Y_IN,Z_IN,COMPOSITE ROTATION MATRIX @ COMP_M IN RAM
;      OUTS: X_IN=X_OUT, Y_IN=Y_OUT, Z_IN=Z_OUT
;  DESTROYS: SOURCE,DEST,VECT_IN,MAT_PTR,VECT_OUT_PTR,ROW_INDEC,COL_INDEX,
;            MUL_RES,SUM_PROD,VECT_IN_PTR,COUNT
;     CALLS: MATRIX_TO_REGS,ROTATE_VECT
;  DESCRIPT: ROTATE INPUTS TO BODY ALIGNMENT ESTABLISHED BY LEVELING PROCEDURE
;****************************************************************************

ROTATE_TO_LEVEL:

;COPY COMPOSITE ROTATION MATRIX TO REGISTER SPACE
```
14380 A104BCCA    LD       SOURCE,#COMP_M ;LOAD POINTER TO COMPOSITE MATRIX IN RAM
14384 2FF0        SCALL    MATRIX_TO_REGS ;
```

;CALCULATE BODY ALIGNED VECTORS
```
14386 2FE2        SCALL    ROTATE_VECT    ;ROTATE INPUT VECTORS TO BODY AXIS & COPY
                                          ; OUTPUT TO INPUT IN ANTICIPATION OF
                                          ; ANOTHER ROTATION
14388 F0          RET                     ;RETURN FROM ROTATE_TO_LEVEL
```

$PAGE
;****************************************************************************
;SUBROUTINE: CORRECT_IA
;       INS: X_IN,Y_IN,Z_IN
;      OUTS: X_IN=X_OUT, Y_IN=Y_OUT, Z_IN=Z_OUT
;  DESTROYS: SOURCE,DEST,VECT_IN,MAT_PTR,VECT_OUT_PTR,ROW_INDEC,COL_INDEX,
;            MUL_RES,SUM_PROD,VECT_IN_PTR,COUNT
;     CALLS: MATRIX_TO_REGS, ROTATE_VECT
;  DESCRIPT: CORRECT INPUT AXIS MIS_ALIGNMENT
;****************************************************************************

CORRECT_IA:
                  ;COPY INPUT AXIS CORRECTION ROTATION MATRIX TO REGISTER SPACE

```
14389 A1124ACA          LD      SOURCE,#IA_M    ;POINT TO INPUT AXIS CORRECTION MATRIX IN RAM
1438D 2FE7              SCALL   MATRIX_TO_REGS ;
;
;                                       ;CALCULATE INSTRUMENT CASE ALIGNED VECTORS
1438F 2FD9              SCALL   ROTATE_VECT     ;ROTATE INPUT VECTORS TO INSTRUMENT CASE
14391 FG                RET                     ;RETURN FROM CORRECT_IA

;               $PAGE
;               INCLUDE CALIB.ASC       ;GET CALIBRATION ROUTINES
;               ;************************************************************************
;               ;SUBROUTINE: POSITION1
;               ;       INS:  X_IN,Y_IN,Z_IN
;               ;      OUTS:  LOCAL_G,COMPOSITE ROTATION MATRIX IN RAM
;               ;  DESTROYS: SOURCE,DEST,VECT_IN,MAT_PTR,VECT_OUT_PTR,ROW_INDEC,COL_INDEX,
;               ;            MUL_RES,SUM_PROD,TEMP,TEMP1,COUNT,A_PTR,B_PTR,C_PTR,VECT_IN_PTR,
;               ;            COUNT,CPL_INDEX
;               ;     CALLS: CORRECT_IA,MAG3,CALC_ROLL_PITCH_LEVEL,CALC_ROLL_PITCH_MATRIX,
;               ;            COPY,MAT_MAT
;               ;  DESCRIPT: CALIBRATION FOR LEVELING IN FIRST POSITION
;               ; PROCEDURE:  1. CORRECT SENSOR INPUT AXIS
;               ;             2. COMPUTE & STORE LOCAL_G = SQRT(X*X+Y*Y+Z*Z)
;               ;             3. COMPUTE & STORE ROLL1 = ARCSIN(X/LOCAL_G)
;               ;                                PITCH1 = ARCSIN(Y/LOCAL_G*COS(ROLL1))
;               ;             4. COMPUTE & STORE LEVEL MATRIX
;               ;             5. COMPUTE & STORE COMPOSITE MATRIX
;               ;             6. RETURN
;               ;************************************************************************
;
;               POSITION1:      ;CALIBRATION FOR LEVELING IN FIRST POSITION
;
;                               ;PROCESS INPUT OFFSET
14392 EFDD05            LCALL   PROCESS_OFFSET
;
;                               ;CORRECT SENSOR INPUT AXIS RELATIVE TO CASE
14395 2FF2              SCALL   CORRECT_IA
;
;                               ;COMPUTE & STORE LOCAL_GRAV
14397 2861              SCALL   MAG3            ;COMPUTE G
;
14399 C30116BC          ST      RESULT,LOCAL_GRAV
-439D A4
;                                               ;SAVE IN RAM
;
1439E A0A4CA            LD      LOCAL_G,RESULT  ;PREPARE TO COMPUTE ROLL & PITCH ORIENTATION
143A1 2875              SCALL   CALC_ROLL_PITCH_LEVEL
143A3 C30118BC          ST      ROLL,ROLL1      ;SAVE ROLL ANGLE IN RAM
-43A7 CC
143A8 C3011ABC          ST      PITCH,PITCH1    ;SAVE PITCH ANGLE IN RAM
-43AC CE
;
143AD A0CCA0            LD      ARG,ROLL        ;LOAD ROLL ANGLE INPUT
143B0 A9CE84            LD      TEMP,PITCH      ;LOAD PITCH ANGLE INPUT
;
;               CLM:    ;COMPUTE LEVELING MATRIX
143B3 2F5F              SCALL   CALC_PITCH_ROLL_MATRIX
;
;                               ;COPY LEVELING MATRIX TO RAM
```

```
I4385 A1AC000A         LD     SOURCE,#M11      ;POINT TO SOURCE
I4389 A1F23ECC         LD     DEST,#LEVEL_M    ;POINT TO DESTINATION
I438D B109D6           LDB    COUNT,#9         ;COPY 9 ELEMENTS
I43C0 2E9F             SCALL  COPY
;
;                      ;COMPUTE COMPOSITE MATRIX
I43C2 A1124ACA         LD     A_PTR,#IA_M      ;POINT TO IA CORRECTION MATRIX
I43C6 A1AC00CE         LD     B_PTR,#M11       ;POINT TO LEVELING MATRIX
I43CA A104BCCC         LD     C_PTR,#COMP_M    ;POINT TO DESTINATION
I43CE 2E4A             SCALL  MAT_MAT          ;COMPUTE 3X3 MATRIX
I43D0 F0               RET                     ;COMMON RETURN FROM POSITION1 & POSITION2
;
;              $PAGE
;              ;************************************************************
;              ;SUBROUTINE: POSITION2
;              ;   INS:    SOURCE,DEST,VECT_IN,MAT_PTR,VECT_OUT_PTR,ROW_INDEC,COL_INDEX,
;              ;           MUL_RES,SUM_PROD,TEMP,TEMP1,COUNT,VECT_IN_PTR,A_PTR,B_PTR,
;              ;           C_PTR,CPL_INDEX
;              ;   CALLS:  CORRECT_IA,CALC_ROLL_PITCH_LEVEL,CALC_ROLL_PITCH_MATRIX,COPY
;              ;   OUTS:
;              ; DESTROYS:
;              ;   CALLS:  CORRECT_IA,MAG3,CALC_ROLL_PITCH_LEVEL,CALC_ROLL_PITCH_MATRIX,
;              ;           COPY,MAT_MAT
;              ; DESCRIPT: CALIBRATION FOR LEVELING IN SECOND POSITION
;              ; PROCEDURE: 1. CORRECT SENSOR INPUT AXIS
;              ;            2. RETRIEVE G FROM RAM & COMPUTE
;              ;                    ROLL2 = ARCSIN(X/G)
;              ;                    PITCH2 = ARCSIN(Y/G*COS(ROLL1))
;              ;            3. COMPUTE ROLL = (ROLL1+ROLL2)/2
;              ;                    PITCH2 = (PITCH1+PITCH2)/2
;              ;            4. COMPUTE & STORE LEVEL MATRIX
;              ;            5. COMPUTE & STORE COMPOSITE MATRIX
;              ;            6. RETURN
;              ;************************************************************
;
;              POSITION2:      ;CALIBRATION FOR LEVELING IN 2'ND POSITION
;
;                      ;PROCESS INPUT OFFSET
I43D1 EF9E05           LCALL  PROCESS_OFFSET
;
;                      ;CORRECT SENSOR INPUT AXIS RELATIVE TO CASE
I43D4 2FB3             SCALL  CORRECT_IA
;
;                      ;RECALL LOCAL_GRAV FROM RAM
I43D6 A30116BC         LD     LOCAL_G,LOCAL_GRAV
-43DA CA
;
;                      ;COMPUTE ROLL & PITCH ORIENTATION IN POSITION 2
I43DB 2D3B             SCALL  CALC_ROLL_PITCH_LEVEL
;
;                      ;COMPUTE AVERAGE OF ANGLES CALCULATED IN POSITIONS 1 & 2
I43DD A30118BC         LD     ARG,ROLL1        ;GET ROLL ANGLE AT POSITION 1 FROM RAM
-43E1 A0
I43E2 A3011ABC         LD     TEMP,PITCH1      ;GET PITCH ANGLE AT POSITION 1 FROM RAM
-43E6 B4
;
I43E7 64C0A0           ADD    ARG,ROLL         ;AVERAGE ROLL ANGLES
```

```
143EA 0A01A6            SHRA    ARG,#1          ;
;
143ED 64C384            ADD     TEMP,PITCH      ;AVERAGE PITCH ANGLES
143F0 0A0184            SHRA    TEMP,#1         ;
;
143F3 27EE              SJMP    CLM             ;JUMP TO COMPUTE LEVELING MATRIX
!               $PAGE
!               ;***************************************************************
!               ;SUBROUTINE:    MAG2
!               ;       INS:    X_IN,Y_IN
!               ;       OUTS:   MAGNITUDE IN RESULT
!               ;   DESTROYS:   COUNT,A_PTR,ARG,TEMP
!               ;      CALLS:   SQRT
!               ;   DESCRIPT:   COMPUTE MAGNITUDE OF X,Y
!               ;***************************************************************
!
!               MAG2:
!
143F5 B10206            LDB     COUNT,#2        ;PROCESS 2 ELEMENTS
143F8 2003              SJMP    MAGX            ;JUMP TO CONTINUE
!
!               ;***************************************************************
!               ;SUBROUTINE:    MAG3
!               ;       INS:    X_IN,Y_IN,Z_IN
!               ;       OUTS:   MAGNITUDE IN RESULT
!               ;   DESTROYS:   COUNT,A_PTR,ARG,TEMP
!               ;      CALLS:   SQRT
!               ;   DESCRIPT:   COMPUTE MAGNITUDE OF X,Y,Z
!               ;***************************************************************
!
!               MAG3:
;
143FA B103D6            LDB     COUNT,#3        ;PROCESS 3 ELEMENTS
143FD A1E000CA  MAGX:   LD      A_PTR,#X_IN     ;POINT TO THE INPUT VECTOR
14401 01A0              CLR     ARG             ;CLEAR SUMMATION REGISTERS
14403 01A2              CLR     ARG+2           ;
14405 A2CB84    MAG_L:  LD      TEMP,[A_PTR]+   ;LOAD ELEMENT
14408 FE6C8484          MUL     TEMP,TEMP       ;COMPUTE ELEMENT SQUARED
1440C 6484A0            ADD     ARG,TEMP        ;ADD 2 WORDS
1440F A486A2            ADDC    ARG+2,TEMP+2    ;
14412 E0D6F0            DJNZ    COUNT,MAG_L     ;LOOP TILL DONE
!
14415 2004              SCALL   SQRT            ;CALCULATE SQUARE ROOT
14417 F0                RET                     ;RETURN FROM MAG3
!               $PAGE
!               ;***************************************************************
!               ;SUBROUTINE:    CALC_ROLL_PITCH_LEVEL
!               ;       INS:    X_IN,Y_IN,LOCAL_G
!               ;       OUTS:   ROLL,PITCH
!               ;   DESTROYS:   TEMP,TEMP1,ARG
!               ;      CALLS:   ARCSIN,SINCOS
!               ;   DESCRIPT:   CALCULATE INSTRUMENT ROLL & PITCH ORIENTATION RE LEVEL
!               ;               ROLL = ARCSIN (X_IN/LOCAL_G)
!               ;               PITCH = ARCSIN (Y_IN/(LOCAL_G*COS(ROLL)));
!               ;***************************************************************
!
```

```
                CALC_ROLL_PITCH_LEVEL:
;
;               ;CALCULATE ROLL ANGLE
14418 A0E0A2    LD      ARG+2,X_IN      ;CALCULATE X_IN/LOCAL_G
1441B 01A0      CLR     ARG             ;
1441D 0E03A0    SHRAL   ARG,#3          ;SCALE INPUT
14420 FEBCCAA0  DIV     ARG,LOCAL_G     ;
14424 2D49      SCALL   ARCSIN          ;CALC ARCSIN
14426 A0BECC    LD      ROLL,A_SIN      ;SAVE ROLL ANGLE
;
;               ;CALCULATE (LOCAL_G*COS(ROLL))
14429 A0BEA0    LD      ARG,A_SIN       ;CALCULATE COS(ROLL)
1442C 2D22      SCALL   SINCOS          ;
1442E FE4CCAC0  MUL     TEMP,COS,LOCAL_G ;CALCULATE (LOCAL_G*COS(ROLL))
-4432 84
14433 0E0D84    SHRAL   TEMP,#13        ;NORMALIZE
14436 A0E2A2    LD      ARG+2,Y_IN      ;CALCULATE (Y_IN/(LOCAL_G*COS(ROLL)))
14439 01A0      CLR     ARG             ;
1443B 0E03A0    SHRAL   ARG,#3          ;SCALE INPUT
1443E FE8C84A0  DIV     ARG,TEMP        ;
14442 2D2B      SCALL   ARCSIN          ;CALCULATE PITCH ANGLE
14444 A0BECE    LD      PITCH,A_SIN     ;SAVE PITCH ANGLE
14447 F0       RET                      ;RETURN FROM CALC ROLL PITCH LEVEL
        $PAGE
        ;***************************************************************
        ;SUBROUTINE: IDENT_MAT
        ;   INS:    A_PTR = POINTER TO START OF IDENTITY MATRIX
        ;   OUTS:   IDENTITY MATRIX @ A_PTR
        ;   DESTROYS: COUNT,A_PTR
        ;   CALLS:  NONE
        ;   DESCRIPT: GENERATE IDENTITY MATRIX
        ;***************************************************************

IDENT_MAT:

14448 B109D6    LDB     COUNT,#9        ;CLEAR 9 CONSECUTIVE WORDS
1444B C2CB00 I_L: ST    0,[A_PTR]+      ;
1444E E0D6FA    DJNZ    COUNT,I_L       ;

14451 A10020D6  LD      COUNT,#2000H    ;LOAD UNITY
14455 C3CAEED6  ST      COUNT,-18[A_PTR] ;LOAD ELEMENT 1,1
14459 C3CAF6D6  ST      COUNT,-10[A_PTR] ;LOAD ELEMENT 2,2
1445D C3CAFED6  ST      COUNT,-2[A_PTR] ;LOAD ELEMENT 3,3

14461 F0        RET                     ;RETURN FROM IDENT_MAT
        $PAGE
        ;***************************************************************
        ;SUBROUTINE: CALC_IA_M
        ;   INS:    ARG = ERROR ANGLE (RADIANS)
        ;   OUTS:   IA_M (INPUT AXIS CORRECTION MATRIX)
        ;   DESTROYS: TEMP,TEMP1,SOURCE,DEST,COUNT
        ;   CALLS:  SINCOS,COPY
        ;   DESCRIPT: CALCULATE INPUT AXIS CORRECTION MATRIX
        ;***************************************************************

CALC_IA_M:
```

```
14462 2CEC            SCALL   SINCOS          ;CALCULATE SINE & COSINE OF ERROR ANGLE
14464 A0BEB0          LD      M13,SIN         ;LOAD ELEMENT 1,3
14467 A0C0B4          LD      M22,COS         ;LOAD ELEMENT 2,2
1446A A0C0BC          LD      M33,COS         ;LOAD ELEMENT 3,3
1446D A0BEB2          LD      M21,SIN         ;LOAD ELEMENT 2,1
14470 03B2            NEG     M21             ;
;
;                     ;LOAD ELEMENT 1,1
14472 FE4CBCBC        MUL     TEMP,M33,M33    ;CALC COS(ANGLE)*COS(ANGLE)
-4476 84
14477 0E0D84          SHRAL   TEMP,#13        ;NORMALIZE
1447A A084AC          LD      M11,TEMP        ;LOAD
;
;                     ;LOAD ELEMENT 1,2
1447D FE4CBCB0        MUL     TEMP,M13,M33    ;CALC SIN(ANGLE)*COS(ANGLE)
-4481 84
14482 0E0D84          SHRAL   TEMP,#13        ;NORMALIZE
14485 A084AE          LD      M12,TEMP        ;LOAD
;
;                     ;LOAD ELEMENT 3,2
14488 FE4CB0B2        MUL     TEMP,M21,M13    ;CALC -SIN(ANGLE)*SIN(ANGLE)
-448C 84
1448D 0E0D84          SHRAL   TEMP,#13        ;NORMALIZE
14490 A084BA          LD      M32,TEMP        ;LOAD
;
;                     ;LOAD ELEMENT 3,1
14493 A0AEB8          LD      M31,M12         ;COPY SIN(ANGLE)*COS(ANGLE)
14496 03B8            NEG     M31             ;NEGATE
;
;                     ;LOAD ELEMENT 2,3
14498 01B6            CLR     M23             ;LOAD 0
;
;                     ;STORE MATRIX IN RAM
1449A A1AC00CA        LD      SOURCE,#M11     ;POINT TO SOURCE
1449E A1124ACC        LD      DEST,#IA_M      ;POINT TO DESTINATION
144A2 B109D6          LDB     COUNT,#9        ;COPY 9 ELEMENTS
144A5 2DBA            SCALL   COPY
;
144A7 F0              RET                     ;RETURN FROM CALC_IA_M
        $PAGE
;****************************************************************************
;SUBROUTINE: BIN_TO_TIME
;       INS: ARG = BINARY TIME INPUT IN TENTHS OF SECONDS
;            A_PTR = POINTER TO BCD OUTPUT STRING
;      OUTS: 4 BCD DIGITS IN BYTES STARTING @ A-PTR, INCREASINGLY SIGNIFICANT
;            DIGITS AT DECREASING ADDRESSES.  FORMAT M:SS.S
;  DESTROYS: ARG,ARG+2,COUNT,A_PTR
;     CALLS: BIN_TO_BCD2
;   DESCRIPT: CONVERTS BINARY INPUT IN ARG TO BCD TIME.
;            MAX INPUT VALUE = 5999T = 176FH = 9:59.9
;****************************************************************************
;
        BIN_TO_TIME:
;
144A8 280F             SCALL   BIN_TO_BCD2    ;CALCULATE 2 LEAST SIGNIFICANT DIGITS
144AA 01A2             CLR     ARG+2          ;CLEAR REMAINDER
144AC 8D0600A0         DIVU    ARG,#6         ;DETERMINE TENS OF SECONDS
144B0 C6CAA2           STB     ARG+2,[A_PTR]  ;STORE TENS OF SECONDS
144B3 05CA             DEC     A_PTR          ;DECREMENT POINTER
144B5 C6CAA0           STB     ARG,[A_PTR]    ;STORE MINUTES
```

```
1448B F0              RET                    ;RETURN FROM BIN_TO_TIME
;
;
;
;        ;**************************************************************
;        ;SUBROUTINE: BIN_TO_BCD2
;        ;     INS: ARG = BINARY INPUT
;        ;          A_PTR = POINTER TO BCD OUTPUT STRING
;        ;     OUTS: 2 BCD DIGITS IN BYTES STARTING @ A_PTR, INCREASINGLY SIGNIFICANT
;        ;          DIGITS AT DECREASING ADDRESSES.
;        ; DESTROYS: ARG,ARG+2,COUNT,A_PTR
;        ;    CALLS: NONE
;        ; DESCRIPT: CONVERTS BINARY INPUT IN ARG TO BCD. MAX INPUT VALUE = 99
;        ;**************************************************************
;
;        BIN_TO_BCD2:
;
14489 B102D6          LDB    COUNT,#2        ;CONVERT 2 BCD DIGITS
1448C 2003            SJMP   CNVL1           ;JUMP TO CONTINUE CONVERSION
;
;        ;**************************************************************
;        ;SUBROUTINE: BIN_TO_BCD3
;        ;     INS: ARG = BINARY INPUT
;        ;          A_PTR = POINTER TO BCD OUTPUT STRING
;        ;     OUTS: 3 BCD DIGITS IN BYTES STARTING @ A-PTR, INCREASINGLY SIGNIFICANT
;        ;          DIGITS AT DECREASING ADDRESSES.
;        ; DESTROYS: ARG,ARG+2,COUNT,A_PTR
;        ;    CALLS: NONE
;        ; DESCRIPT: CONVERTS BINARY INPUT IN ARG TO BCD. MAX INPUT VALUE = 999
;        ;**************************************************************
;
;        BIN_TO_BCD3:
;
1448E B103D6          LDB    COUNT,#3        ;CONVERT 3 BCD DIGITS
144C1 01A2   CNVL1:   CLR    ARG+2           ;CLEAR HIGH WORD OF ARG
144C3 8D0A00A0        DIVU   ARG,#10         ;DIVIDE INPUT BY DECIMAL 10
144C7 C6CAA2          STB    ARG+2,[A_PTR]   ;STORE REMAINDER AS BCD DIGIT
144CA 05CA            DEC    A_PTR           ;DECREMENT POINTER
144CC E0D6F2          DJNZ   COUNT,CNVL1     ;LOOP TILL DONE
144CF F0              RET                    ;RETURN FROM BIN_TO_BCD3
;
;
;        ;**************************************************************
;        ;SUBROUTINE: BCD3_TO_BIN
;        ;     INS: 3 BCD DIGITS, INCREASINGLY SIGNIFICANT DIGITS AT DECENDING
;        ;          ADDRESSES.
;        ;          A_PTR = POINTER TO MOST SIGINIFICANT DIGIT
;        ;     OUTS: ARG = BINARY OUTPUT
;        ; DESTROYS: A_PTR
;        ;    CALLS: NONE
;        ; DESCRIPT: CONVERTS 3 DIGIT BCD NUMBER TO BINARY. MAX INPUT = 999
;        ;**************************************************************
;
;        BCD3_TO_BIN:
;
144D0 B103D6          LDB    COUNT,#3        ;PROCESS 3 BCD DIGITS
144D3 01A0            CLR    ARG             ;CLEAR WORKING REGISTER
144D5 6D0A00A0 CNVL2: MULU   ARG,#10         ;DECADE MULTIPLY
```

```
I44D9 AECBA2           LDBZE   ARG+2,[A_PTR]+  ;LOAD BCD DIGIT INTO WORD REGISTER
I44DC 64A2A0           ADD     ARG,ARG+2       ;ADD BCD DIGIT
I44DF E0D6F3           DJNZ    COUNT,CNVL2     ;LOOP TILL DONE
I44E2 F0               RET                     ;RETURN FROM BCD3_TO_BIN
I              $PAGE
I              ;******************************************************************
I              ;SUBROUTINE: CLR_AVG
I              ;      INS: NONE
I              ;     OUTS: NONE
I              ; DESTROYS: A_PTR,COUNT
I              ;    CALLS: NONE
I              ; DESCRIPT: CLEARS 8-WORD ARRAY IN RAM @ X_AVG, CLEARS AVG_COUNT
I              ;******************************************************************
I
I              CLR_AVG:
I
I44E3 B108D6           LDB     COUNT,#8        ;CLEAR 8 WORDS
I44E6 A14CBCCA         LD      A_PTR,#X_AVG    ;POINT TO AVERAGING ARRAY
I44EA C2CB00   CLRL:   ST      0,[A_PTR]+      ;
I44ED E0D6FA           DJNZ    COUNT,CLRL      ;LOOP TIL DONE
I44F0 C3015CBC         ST      0,AVG_COUNT     ;CLEAR AVG_COUNT
-44F4 00
I44F5 F0               RET                     ;RETURN FROM CLR_AVG
I
I
I              ;******************************************************************
I              ;SUBROUTINE: ACCUM_AVG
I              ;      INS: NONE
I              ;     OUTS: NONE
I              ; DESTROYS: A_PTR,B_PTR,TEMP,COUNT   ARG,TEMP,RESULT
I              ;    CALLS: MAG3
I              ; DESCRIPT: ADD INPUT SAMPLES TO AVERAGE ACCUMULATERS, BUMP AVG_COUNT
I              ;******************************************************************
I
I              ACCUM_AVG:
I
I44F6 2F02             SCALL   MAG3            ;COMPUTE MAGNITUDE OF X,Y,Z
I44F8 A0A4E6           LD      Z_IN+2,RESULT   ;MOVE RESULT TO ARRAY FOR AVERAGING
I
I44FB B104D6           LDB     COUNT,#4        ;PROCESS 3 INPUT AXIS & MAG
I44FE A14CBCCA         LD      A_PTR,#X_AVG    ;POINT TO AVERAGING ARRAY
I4502 A1E000CE         LD      B_PTR,#X_IN     ;POINT TO X AXIS
I
I4506 A2CF84   ACCUML: LD      TEMP,[B_PTR]+   ;GET INPUT VECTOR & CONVERT TO A LONG WORD
I4509 0684             EXT     TEMP            ;
I450B 66CA84           ADD     TEMP,[A_PTR]    ;ADD LOW WORD OF ACCUM TO CURRENT SAMPLE
I450E C2CB84           ST      TEMP,[A_PTR]+   ;STORE RESULT
I4511 A6CA86           ADDC    TEMP+2,[A_PTR]  ;ADD HIGH WORD OF ACCUM TO CURRENT SAMPLE
I4514 C2CB86           ST      TEMP+2,[A_PTR]+ ;STORE RESULT
I4517 E0D6EC           DJNZ    COUNT,ACCUML    ;LOOP TILL DONE
I
I451A A3015CBC         LD      TEMP,AVG_COUNT  ;BUMP AVG_COUNT
-451E 84
I451F 0784             INC     TEMP            ;
I4521 C3015CBC         ST      TEMP,AVG_COUNT  ;
-4525 84
I4526 F0               RET                     ;RETURN FROM ACCUM_AVG
```

```
            ;****************************************************************
            ;SUBROUTINE: CALC_AVG
            ;    INS:  A_PTR = POINTER TO BOTTOM OF 3 WORD ARRAY FOR DESTINATION
            ;    OUTS: NONE
            ; DESTROYS: A_PTR,B_PTR,TEMP,ARG,COUNT
            ;   CALLS: NONE
            ; DESCRIPT: CALCULATE AVERAGES AND STORE IN RAM
            ;****************************************************************

CALC_AVG:
14527 B104D6        LDB    COUNT,#4        ;PROCESS 3 INPUT AXIS & MAG
1452A A14CBCCE      LD     B_PTR,#X_AVG    ;POINT TO AVERAGING ARRAY

1452E A2CF84  CALCL: LD    TEMP,[B_PTR]+   ;GET ACCUMULATOR LOW WORD
14531 A2CF86        LD     TEMP+2,[B_PTR]+ ;GET ACCUMULATOR HIGH WORD
14534 FE8F015C      DIV    TEMP,AVG_COUNT  ;CALCULATE AVERAGE = ACCUM/AVG_COUNT
-4538 8C84
1453A C2CB84        ST     TEMP,[A_PTR]+   ;STORE RESULT
1453D E0D6EE        DJNZ   COUNT,CALCL     ;LOOP TILL DONE

14540 F0           RET                     ;RETURN FROM CALC_AVG

;****************************************************************
            ;SUBROUTINE: RAD_TO_DEG
            ;    INS:  A_PTR = POINTER TO BCD OUPTUT STRING (BYTES @ A_PTR, ASCENDING)
            ;          ARG = INPUT ANGLE GAIN IN RADIANS
            ;    OUTS: BIN_AG=BINARY ANGLE GAIN
            ; DESTROYS: A_PTR,ARG
            ;   CALLS: BIN_TO_BCD3
            ; DESCRIPT: CONVERTS BINARY RADIAN MEASURE (2**13 = 1 RADIAN) TO BCD
            ;          (TENS,UNITS,TENTHS). OUTPUT = (INPUT/2**13)*57.295*10 =
            ;          = (INPUT/2**16)*57.295*10*8 = (INPUT/2**16)*4583.66
            ;****************************************************************

RAD_TO_DEG:

14541 FE6DE811      MUL    ARG,#4584       ;* CONVERSION FACTOR
-4545 A0

;LOAD INPUT ARG TO BCD3_TO_BIN = PRODUCT/2**16
14546 65008060      ADD    ARG,#8000H      ;RND UPPER WORD ACCORDING TO MSB IN LOWER WORD
1454A A409A2        ADDC   ARG+2,0         ;
1454D A062A0        LD     ARG,ARG+2       ;SCALE BY 1/2**16
14550 C0F2A0        ST     ARG,BIN_AG      ;STORE BINARY ANGLE GAIN
14553 2F69          SCALL  BIN_TO_BCD3     ;CONVERT TO BCD
14555 F0            RET                    ;RETURN FROM RAD_TO_BCD

;****************************************************************
            ;SUBROUTINE: DEG_TO_RAD
            ;    INS:  A_PTR = POINTER TO MSD OF BCD INPUT
            ;    OUTS: RADIAN RESULT IN ARG
            ; DESTROYS:
            ;   CALLS: BCD3_TO_BIN
            ; DESCRIPT: CONVERTS BCD ANGLE MEASURE (TENS,UNITS,TENTHS) TO BINARY
```

```
;                            RADIAN MEASURE (2**13 = 1 RADIAN).
;                            (TENS,UNITS,TENTHS). OUTPUT = (INPUT/(57.295*10))*2**13 =
;                            (INPUT/(57.295*10*8))*2*16 = (INPUT*2**16)/4583.66
;***************************************************************************

DEG_TO_RAD:

14556 2F78              SCALL   BCD3_TO_BIN     ;CONVERT INPUT TO BINARY
14558 A0A0A2            LD      ARG+2,ARG       ;SCALE * 2**16
1455B 01A0              CLR     ARG             ;
1455D FE8DEB11          DIV     ARG,#4584       ;DIVIDE BY CONVERSION FACTOR
-4561 A0
14562 F0                RET                     ;RETURN FROM DEG_TO_RAD

;***************************************************************************
;SUBROUTINE: BIN_AG_TO_RAD
;     INS:  BIN_AG
;           A_PTR = POINTER TO DESTINATION
;     OUTS: RADIAN ANGLE GAIN @ A_PTR
; DESTROYS: ARG, ARG+2
;    CALLS: NONE
; DESCRIPT: CONVERT BINARY ANGLE GAIN TO RADIANS & STORE @ A_PTR
;***************************************************************************

BIN_AG_TO_RAD:

14563 A0F2A2            LD      ARG+2,BIN_AG    ;SCALE * 2**16
14566 01A0              CLR     ARG             ;
14568 FE8DEB11          DIV     ARG,#4584       ;DIVIDE BY CONVERSION FACTOR
-456C A0
1456D C2CAA0            ST      ARG,[A_PTR]     ;STORE RESULT @ A_PTR
14570 F0                RET                     ;RETURN FROM BIN_AG_TO_RAD

;***************************************************************************
;SUBROUTINE: CALC_ANGLE_GAIN
;      INS: A_PTR = POINTER TO X OR Y (I.E. HORIZONTAL) SLOW AVERAGE
;           B_PTR = POINTER TO Z SLOW AVERAGE
;     OUTS: OUPTPUT IN ARG
; DESTROYS: PY,GY,TEMP,TEMP1,ARG,RESULT,A_PTR,B_PTR
;    CALLS: ARCTAN_A_DIV_B,ARCTAN,SQRT
; DESCRIPT:
; PROCEDURE: 1. COMPUTE A = ARCTAN(SLOW_HORIZONTAL/SLOW_VERTICAL)
;            1A. COMPUTE ACCELERATION OF GRAVITY FROM LOW SPEED DATA
;            2. ADJUST POINTERS TO FAST_HORIZONTAL & FAST_VERTICAL
;            3. COMPUTE B = ARCTAN(FAST_HORIZONTAL/FAST_VERTICAL)
;            4. COMPUTE E = ABSOLUTE VALUE (B-A)
;            5. COMPUTE C = SQRT(FAST_HORIZ**2 +FAST_VERT**2 -LOCAL_GRAV**2)
;            6. COMPUTE D = ARCTAN(C)
;            7. COMPUTE E = D-B
;            8. COMPUTE ANGLE_GAIN = B/C
;
;***************************************************************************

CALC_ANGLE_GAIN:

;   1. COMPUTE A = ARCTAN(SLOW_HORIZONTAL/SLOW_VERTICAL)
```

```
14571 2860           SCALL   ARCTAN_A_DIV_B    ;
14573 A0BED2         LD      PY,A_TAN          ;SAVE RESULT
;
;                    1A. COMPUTE ACCELERATION OF GRAVITY FROM LOW SPEED DATA
14576 2CE0           SCALL   VECT_TO_XYZ       ;MOVE SLOW VECTOR TO X_IN
14578 C8CA           PUSH    A_PTR
1457A 2E7E           SCALL   MAG3              ;COMPUTE MAGNITUDE
1457C C30160BC       ST      RESULT,TEMP_GRAV
-4580 A4
;
;                    2. ADJUST POINTERS TO FAST_HORIZONTAL & FAST_VERTICAL
;                    ADD     A_PTR,#6          ;
14581 CCCA           POP     A_PTR             ;
14583 650600CE       ADD     B_PTR,#6          ;
;
;                    3. COMPUTE B = ARCTAN(FAST_HORIZONTAL/FAST_VERTICAL)
14587 2857           SCALL   ARCTAN_A_DIV_B    ;
;
;                    4. COMPUTE B = ABSOLUTE VALUE (B-A)
14589 48D2BED2       SUB     PY,A_TAN,PY       ;
1458D D602           JGE     POS_B             ;JUMP IF B IS POSITIVE
1458F 03D2           NEG     PY                ;ELSE, CONVERT NEGATIVE RESULT TO POSITIVE
              POS_B:
;
;                    5. COMPUTE C = SQRT(FAST_HORIZ**2 +FAST_VERT**2 -LOCAL_GRAV**2)
14591 A2CAA0         LD      ARG,[A_PTR]       ;CALC FAST_HORIZ**2
14594 FE6CA0A0       MUL     ARG,ARG           ;
;
14598 A2CEB4         LD      TEMP,[B_PTR]      ;CALC FAST_VERT**2
1459B FE6C8484       MUL     TEMP,TEMP         ;
;
1459F 6484A0         ADD     ARG,TEMP          ;SUM OF SQUARES
145A2 A486A2         ADDC    ARG+2,TEMP+2      ;
;
145A5 A30160BC       LD      TEMP,TEMP_GRAV    ;CALC TEMP_GRAV**2
-45A9 84
145AA FE6C8484       MUL     TEMP,TEMP         ;
;
145AE 6884A0         SUB     ARG,TEMP          ;DIFFERENCE OF SQUARES
145B1 A886A2         SUBC    ARG+2,TEMP+2      ;
;
145B4 DE27           JLT     RTG               ;ABORT IF DIFFERENCE IS NEGATIVE, ELSE
;
145B6 EF62FB         LCALL   SQRT              ;CALC SQUARE ROOT
;
145B9 FE4D0020       MUL     ARG,RESULT,#2000H ;CONVERT TO RADIAN MEASURE
-45BD A4A0
145BF FE8F0160       DIV     ARG,TEMP_GRAV     ;DIVIDE BY LOCAL GRAVITY
-45C3 BCA0
145C5 A0A0D4         LD      QY,ARG            ;SAVE RESULT
;
;                    6. COMPUTE D = ARCTAN(C)
145C8 EFBCFB         LCALL   ARCTAN            ;
;
;                    7. COMPUTE B = D-B  & SCALE TO PREP FOR DIVISION
```

```
145C8 488ED2A2          SUB     ARG+2,PY,A_TAN   ;
145CF 01A0              CLR     ARG              ;
145D1 0E03A0            SHRAL   ARG,#3           ;

145D4 DE07              JLT     RT0              ;ABORT IF DIFFERENCE IS NEGATIVE, ELSE

;       8. COMPUTE ANGLE_GAIN = B/C
145D6 FEECD4A0          DIV     ARG,@Y           ;

145DA DE01              JLT     RT0              ;ABORT IF RESULT IS NEGATIVE, ELSE

145DC F0                RET                      ;RETURN FROM ANGLE_GAIN

RT0:    ;RETURN ARG = 0
145DD 01A0              CLR     ARG
145DF F0                RET                      ;RETURN FROM ANGLE_GAIN $PAGE
;################################################################################
;SUBROUTINE: ARCTAN_A_DIV_B
;       INS: A_PTR = POINTER TO INPUT A
;            B_PTR = POINTER TO INPUT B
;      OUTS: OUTPUT WORD IN A_TAN
;  DESTROYS: ARG,TEMP,TEMP1
;     CALLS: ARCTAN
;  DESCRIPT:
;################################################################################

ARCTAN_A_DIV_B:

145E0 A2CAA2            LD      ARG+2,[A_PTR]    ;GET INPUT A & SCALE TO PREP FOR DIVISION
145E3 01A0              CLR     ARG              ;
145E5 0E03A0            SHRAL   ARG,#3           ;
145EB FEBECEA0          DIV     ARG,[B_PTR]      ;
145EC EF9BFB            LCALL   ARCTAN           ;COMPUTE ARCTANGENT
145EF F0                RET                      ;RETURN FORM ARCTAN_A_DIV_B

;       END              ;END OF ROTATE.ASC

CAL_TABLE:       ;TABLE OF CALIBRATE PROCEDURE VECTORS

45F0 5546               DW      CAL1
45F2 7D46               DW      CAL2
45F4 A546               DW      CAL3
45F6 0C47               DW      CAL7

MP_STRT_CAL:

45FB 51FD80A0           ANDB    MP_TEMP,MODE_SW,#11111101B
                                                 ;TEST FOR ILLEGAL KEYS

45FC D722               JNE     STP_SET          ;IF ILLEGAL KEYS, JUMP TO SET STOP MODE

45FE 31801F             JBC     MODE_SW,1,STP_SET ;IF CAL BUTTON NOT ACTIVE, SET STOP

4601 E0B126             DJNZ    MP_SME_C,MP_STRT_CAL_RET
                                                 ;ELSE-DECREMENT SAME BUTTON COUNTER
```

```
               MP_STRT_CAL1:
4604 A113467A          LD      MODE_TASK,#MP_CAL        ;ON 0, SET MODE TO MP_CAL, ELSE RETURN
4608 EFD5FA            LCALL   PNTR_COLLAPSE            ;SINGLE IMAGE
460B EFD8FA            LCALL   CLEAR_ALL                ;CLEAR ENTIRE DISPLAY
460E B101F6            LDB     CAL_N,#1                 ;INITIALIZE THE CALIBRATE PROCEDURE = 1

4611 2022              SJMP    CAL_N_OK                 ;DETERMINE NEW CAL MODE, AND BRANCH TO
                                                        ; SELECTED CAL MODE.

4613 3A800A    MP_CAL: JBS     MODE_SW,2,STP_SET        ;IF STOP KEY IS ACTIVE, JUMP

4616 B30157B8          LDB     MP_TEMP,SWR              ;JUMP IF DISPLAY_SELECT KEY IS ACTIVE
-461A A0
461B 3CA00D            JBS     MP_TEMP,4,DIS_SEL_ACT
461E 2020              SJMP    BR_CAL                   ;ELSE, BRANCH TO CAL TASK

STP_SET:                                 ;SET MODE = STOP
4620 EFC3FA            LCALL   CLEAR_ALL
4623 EFBDFA            LCALL   PNTR_EXPAND
4626 A1FB407A          LD      MODE_TASK,#MP_STOP

462A F0        MP_STRT_CAL_RET:   RET

DIS_SEL_ACT:                             ;DISPLAY SELECT KEY ACTIVE.

462B 17F6              INCB    CAL_N                    ;INCREMENT CAL_N, RANGE 1-4.
462D 9904F6            CMPB    CAL_N,#4                 ;PERFORM COMPARISON
4630 DA03              JLE     CAL_N_OK                 ;JUMP IF CAL_N WITHIN LEGAL RANGE

4632 E7C6FA            LJMP    MP_START_SCALE           ;JUMP BACK TO SCALING CALIBRATION
                                                        ;  ROUTINE.
               CAL_N_OK:

4635 ACF6F0            LDBZE   CAL_MODE,CAL_N           ;GET CAL_N
4638 64F0F0            ADD     CAL_MODE,CAL_MODE        ;CAL_N *2 SINCE VECTORS ARE WORDS

463B A3F1EE45          LD      CAL_MODE,CAL_TABLE-2[CAL_MODE]
-463F F0
                                                        ;TABLE LABEL -2 SINCE CAL_N
                                                        ; STARTS AT 1.

4640 E3F0      BR_CAL: BR      [CAL_MODE]               ;JUMP TO MODE-DEPENDENT PROCESSING

CAL_DONE:
4642 A15B486C          LD      ICON_P,#ICON_DONE1
4646 EF8F01            LCALL   LOAD_ICON_DMI1_DEST
4649 A16E486C          LD      ICON_P,#ICON_DONE2
464D EF8201            LCALL   LOAD_ICON_DMI1_DEST

4650 A15446F0          LD      CAL_MODE,#CAL_IDLE
4654 F0        CAL_IDLE:   RET                          ;RETURN FROM CAL_DONE
```

```
                $PAGE
                ;**********************
                ; ROUTINE: CAL1                  ;LEVEL POSITION 1
                ;**********************
                CAL1:
4655 A1FE486C           LD      ICON_P,#ICON_LEVEL1
4659 EF7C01             LCALL   LOAD_ICON_DMI1_DEST
465C A11B496C           LD      ICON_P,#ICON_CAR1
4660 EF7501             LCALL   LOAD_ICON_DMI1_DEST
4663 A11E486C           LD      ICON_P,#ICON_OK?1
4667 EF6E01             LCALL   LOAD_ICON_DMI1_DEST
466A A13B486C           LD      ICON_P,#ICON_OK?2
466E EF6701             LCALL   LOAD_ICON_DMI1_DEST
4671 A17546F0           LD      CAL_MODE,#CAL1_1
4675 338004     CAL1_1: JBC     MODE_SW,3,CAL1_RET   ;IF REC-N KEY INACTIVE, JMP TO RETURN
4678 2D18               SCALL   POSITION1            ;ELSE, EXECUTE POSITION 1 LEVELING 467A 27C6               SJMP    CAL_DONE

467C F0         CAL1_RET:       RET                  ;RETURN FROM CAL1

;**********************
                ; ROUTINE: CAL2                  ;LEVEL POSITION 2
                ;**********************
                CAL2:
467D A138496C           LD      ICON_P,#ICON_LEVEL2
4681 EF5401             LCALL   LOAD_ICON_DMI1_DEST
4684 A155496C           LD      ICON_P,#ICON_CAR2
4688 EF4D01             LCALL   LOAD_ICON_DMI1_DEST
468B A11E486C           LD      ICON_P,#ICON_OK?1
468F EF4601             LCALL   LOAD_ICON_DMI1_DEST
4692 A13B486C           LD      ICON_P,#ICON_OK?2
4696 EF3F01             LCALL   LOAD_ICON_DMI1_DEST

4699 A19D46F0           LD      CAL_MODE,#CAL2_1

469D 338004     CAL2_1: JBC     MODE_SW,3,CAL2_RET   ;IF REC-N KEY INACTIVE, JMP TO RETURN
46A0 2D2F               SCALL   POSITION2            ;ELSE, EXECUTE POSITION 2 LEVELING

46A2 279E               SJMP    CAL_DONE             ;

46A4 F0         CAL2_RET:       RET                  ;RETURN FROM CAL1
                $PAGE
                ;**********************
                ; ROUTINE: CAL3                  ;ROLL GAIN
                ;**********************
                CAL3:                           ;MANUAL EDITING OF ROLL_GAIN
46A5 EF41FA             LCALL   CLEAR_DMI1           ;CLEAR THE DOT MATRIX IMAGES.
46A8 A184486C           LD      ICON_P,#ICON_ROLL
46AC EF2901             LCALL   LOAD_ICON_DMI1_DEST
46AF A1A1486C           LD      ICON_P,#ICON_DEGg1
46B3 EF2201             LCALL   LOAD_ICON_DMI1_DEST
46B6 A11E486C           LD      ICON_P,#ICON_OK?1
46BA EF1B01             LCALL   LOAD_ICON_DMI1_DEST
46BD A13B486C           LD      ICON_P,#ICON_OK?2
46C1 EF1401             LCALL   LOAD_ICON_DMI1_DEST
```

```
46C4 A1C1486C      LD      ICON_P,#ICON_DEG2
46C8 EF24FA        LCALL   LOAD_ICON_DMI1              ;'OR' THIS ICON IN NON DESTRUCTIVELY.
46CB 28AD          SCALL   DISP_ROLL_GAIN              ;DISPLAY ROLL_GAIN FROM RAM.

46CD B1FFF8        LDB     KEY_TIME,#-1                ;SET KEY_TIME INACTIVE
46D0 A1D446F0      LD      CAL_MODE,#CAL3_1            ;POINT TO NEXT CAL TASK

CAL3_1:                                     ;ROLL_GAIN EDITING IN PROGRESS

46D4 3F8008        JBS     MODE_SW,7,ADV               ;IF FF ACTIVE, JUMP TO ADVANCE
                                                       ; ANGLE_GAIN.

46D7 3C8014        JBS     MODE_SW,4,RTD               ;IF REW ACTIVE, JUMP TO REDUCE
                                                       ; ANGLE_GAIN.

46DA B1FFF8        LDB     KEY_TIME,#-1                ;ELSE, SET KEYTIME INACTIVE
46DD 201C          SJMP    TC3_REC                     ;JUMP TO TEST RECORD BUTTON

ADV:                                        ;ADVANCE_ANGLE GAIN BRANCH
46DF 15F8          DECB    KEY_TIME                    ;PROCESS KEY_TIME TO TEST FOR AUTO
                                                       ; INCREMENT.
46E1 D218          JGT     TC3_REC                     ;IF KEY_TIME >0, JUMP TO TEST RECORD
                                                       ; BUTTON.
46E3 DF03          JE      AUTO_INC                    ;IF 0, JUMP TO LOAD TIMER FOR AUTO
                                                       ; ADVANCE.
46E5 B109F8        LDB     KEY_TIME,#INT_1-1           ;ELSE, LOAD TIMER WITH INITIAL INTERVAL

AUTO_INC:
46E9 17F8          INCB    KEY_TIME                    ;BUMP TIMER TO CONTINE INC AT 10/SEC

46EA 28A1          SCALL   INC_ANGLE_GAIN              ;INCREMENT DISPLAYED ANGLE_GAIN
46EC 200D          SJMP    TC3_REC                     ;JUMP TO TEST RECORD BUTTON

RTD:                                        ;REDUCE ANGLE_GAIN BRANCH
46EE 15F8          DECB    KEY_TIME                    ;PROCESS KEY_TIME TO TEST FOR AUTO
                                                       ; INCREMENT.
46F0 D209          JGT     TC3_REC                     ;IF KEY_TIME >0, JUMP TO TEST RECORD
                                                       ; BUTTON.
46F2 DF03          JE      AUTO_DEC                    ;IF 0, JUMP TO LOAD TIMER FOR AUTO
                                                       ; ADVANCE.
46F4 B109F8        LDB     KEY_TIME,#INT_1-1           ;ELSE, LOAD TIMER WITH INITIAL INTERVAL

AUTO_DEC:
46F7 17F8          INCB    KEY_TIME                    ;BUMP TIMER TO CONTINE DEC AT 10/SEC
46F9 289C          SCALL   DEC_ANGLE_GAIN              ;DECREMENT DISPLAYED ANGLE_GAIN.

TC3_REC:                                    ;TEST RECORD BUTTON
46FB 338000        JBC     MODE_SW,3,C3RET             ;IF RECORD KEY INACTIVE, JUMP TO RETURN

;ELSE, STORE DISPLAYED ANGLE_GAIN
46FE C30126BC      ST      BIN_AG,BIN_ROLL_GAIN        ;STORE BINARY ROLL GAIN
-4702 F2

IF 0                                ;STORE BCD_ROLL_GAIN
                   LDBZE   ARG,BIN_AG                  ;LOAD INPUT TO CONVERSION ROUTINE
                   LD      A_PTR,#BCD_ROLL_GAIN+2      ;POINT TO RAM FOR DESTINATION
```

```
                        SCALL   BIN_TO_BCD3
                        ENDIF

4703 A11CBCCA           LD      A_PTR,#ROLL_GAIN        ;POINT TO DESTINATION
4707 2E5A               SCALL   BIN_AG_TO_RAD           ;CONVERT BINARY ROLL GAIN TO RADIANS
4709 2737               SJMP    CAL_DONE

470B F0         C3RET:  RET                             ;RETURN FROM CAL3

$PAGE
                ;****************
                ; ROUTINE: CAL7                          ;PITCH GAIN
                ;****************
                CAL7:                                    ;MANUAL EDITING OF PITCH_GAIN
                                                         ;DISPLAY PITCH_GAIN FROM RAM
470C EFDAF9             LCALL   CLEAR_DMI1              ;CLEAR THE DOT MATRIX IMAGE.
470F A1E1486C           LD      ICON_P,#ICON_PITCH
4713 EFC200             LCALL   LOAD_ICON_DMI1_DEST
4716 A1A1486C           LD      ICON_P,#ICON_DEGg1
471A EFBB00             LCALL   LOAD_ICON_DMI1_DEST
471D A11E486C           LD      ICON_P,#ICON_OK?1
4721 EFB400             LCALL   LOAD_ICON_DMI1_DEST
4724 A13B486C           LD      ICON_P,#ICON_OK?2
4728 EFAD00             LCALL   LOAD_ICON_DMI1_DEST
472B A1C1486C           LD      ICON_P,#ICON_DEGg2
472F EFBDF9             LCALL   LOAD_ICON_DMI1          ;'OR' IN THIS ICON NON DESTRUCTIVELY.

4732 283F               SCALL   DISP_PITCH_GAIN

4734 B1FFF8             LDB     KEY_TIME,#-1            ;SET KEY_TIME INACTIVE
4737 A13B47F0           LD      CAL_MODE,#CAL7_1        ;POINT TO NEXT CAL TASK

CAL7_1:                                  ;PITCH_GAIN EDITING IN PROGRESS
473B 3F8008             JBS     MODE_SW,7,ADV1          ;IF FF ACTIVE, JUMP TO ADVANCE
                                                        ; ANGLE_GAIN.

473E 3C8014             JBS     MODE_SW,4,RTD1          ;IF REW ACTIVE, JUMP TO REDUCE
                                                        ; ANGLE_GAIN.

4741 B1FFF8             LDB     KEY_TIME,#-1            ;ELSE, SET KEYTIME INACTIVE
4744 201C               SJMP    TC7_REC                 ;JUMP TO TEST RECORD BUTTON

ADV1:                                    ;ADVANCE_ANGLE GAIN BRANCH
4746 15F8               DECB    KEY_TIME                ;PROCESS KEY_TIME TO TEST FOR AUTO
                                                        ; INCREMENT.
4748 D218               JST     TC7_REC                 ;IF KEY_TIME >0, JUMP TO TEST RECORD
                                                        ; BUTTON.
474A DF03               JE      AUTO_INC1               ;IF 0, JUMP TO LOAD TIMER FOR AUTO
                                                        ; ADVANCE.
474C B109F8             LDB     KEY_TIME,#INT_1-1       ;ELSE, LOAD TIMER WITH INITIAL INTERVAL 474F 17F8       AUTO_INC1: INCB KEY_TIME                ;BUMP TIMER TO CONTINE INC AT 10/SEC

;INCREMENT DISPLAYED ANGLE_GAIN
4751 283A               SCALL   INC_ANGLE_GAIN 4753 200D               SJMP    TC7_REC                 ;JUMP TO TEST RECORD BUTTON
```

```
                RTD1:                           ;REDUCE ANGLE_GAIN BRANCH
4755 15F8               DECB    KEY_TIME        ;PROCESS KEY_TIME TO TEST FOR AUTO
                                                ; INCREMENT.
4757 D209               JGT     TC7_REC         ;IF KEY_TIME >0, JUMP TO TEST RECORD
                                                ; BUTTON.
4759 DF03               JE      AUTO_DEC1       ;IF 0, JUMP TO LOAD TIMER FOR AUTO
                                                ; ADVANCE.
475B B109F8             LDB     KEY_TIME,#INT_1-1  ;ELSE, LOAD TIMER WITH INITIAL INTERVAL 475E 17F8       AUTO_DEC1:  INCB    KEY_TIME    ;BUMP TIMER TO CONTINE DEC AT 10/SEC
4760 2835               SCALL   DEC_ANGLE_GAIN  ;DECREMENT DISPLAYED ANGLE_GAIN

TC7_REC:                        ;TEST RECORD BUTTON
4762 338000             JBC     MODE_SW,3,C7RET ;IF RECORD KEY INACTIVE, JUMP TO RETURN

;ELSE, STORE DISPLAYED ANGLE_GAIN
4765 C30128BC           ST      BIN_AG,BIN_PITCH_GAIN  ;STORE BINARY PITCH GAIN
-4769 F2

IF 0                    ;STORE BCD_PITCH_GAIN
                        LDBZE   ARG,BIN_AG      ;LOAD INPUT TO CONVERSION ROUTINE
                        LD      A_PTR,#BCD_PITCH_GAIN+2  ;POINT TO RAM FOR DESTINATION
                        SCALL   BIN_TO_BCD3
                        ENDIF

476A A11EBCCA           LD      A_PTR,#PITCH_GAIN  ;POINT TO DESTINATION
476E 20F3               SCALL   BIN_AG_TO_RAD   ;CONVERT BINARY ROLL GAIN TO RADIANS 4770 26D0               SJMP    CAL_DONE

4772 F0         C7RET:  RET                     ;RETURN FROM CAL7

$PAGE
                ;****************************************************************
                ;SUBROUTINE: DISP_PITCH_GAIN
                ;     INS: NONE
                ;     OUTS:
                ; DESTROYS:
                ;    CALLS:
                ; DESCRIPT:
                ;****************************************************************

DISP_PITCH_GAIN:

4773 A30128BC           LD      BIN_AG,BIN_PITCH_GAIN  ;LOAD BINARY ROLL GAIN
-4777 F2
4778 2025               SJMP    CRE

;****************************************************************
                ;SUBROUTINE: DISP_ROLL_GAIN
                ;     INS: NONE
                ;     OUTS:
                ; DESTROYS:
                ;    CALLS:
                ; DESCRIPT:
                ;****************************************************************
```

```
                DISP_ROLL_GAIN:

477A A301268C          LD      BIN_AG,BIN_ROLL_GAIN    ;LOAD BINARY ROLL GAIN
-477E F2
477F 201E              SJMP    CRE

;##################################################################
;SUBROUTINE:    DISP_ANGLE_GAIN
;       INS:    SOURCE = POINTER TO BCD ANGLE GAIN IN RAM
;      OUTS:
;  DESTROYS:
;     CALLS:    CLEAR_SSI1
;  DESCRIPT:    COPIES 3 BCD-BYTES TO DISPLAY IMAGE
;##################################################################

DISP_ANGLE_GAIN:

4781 B103D6            LDB     COUNT,#3                ;COPY 3 BYTES
4784 A1B800CD          LD      DEST,#SS_T-2            ;POINT TO IMAGE
4788 EFE0FA            LCALL   COPYB
478B 2027              SJMP    LOAD_ANGLE_GAIN         ;RETURN FROM LOAD_ANGLE_GAIN

;##################################################################
;SUBROUTINE:    INC_ANGLE_GAIN
;       INS:    BIN_AG
;      OUTS:
;  DESTROYS:
;     CALLS:
;  DESCRIPT:
;##################################################################

INC_ANGLE_GAIN:

478D 899600F2          CMP     BIN_AG,#U_BOUND         ;COMPARE WITH UPPER BOUND
4791 D60C              JGE     CRE                     ;JUMP IF CURRENT VALUE .GE. BOUND
4793 07F2              INC     BIN_AG                  ;ELSE, INCREMENT BIN_AG 4795 2008              SJMP    CRE                     ;JUMP TO CONVERT REVISED ESTIMATE TO
                                                       ; BCD.

;##################################################################
;SUBROUTINE:    DEC_ANGLE_GAIN
;       INS:    BIN_AG
;      OUTS:
;  DESTROYS:
;     CALLS:
;  DESCRIPT:
;##################################################################

DEC_ANGLE_GAIN:

4797 B9CEFFF2          CMP     BIN_AG,#L_BOUND         ;COMPARE WITH LOWER BOUND
479B DA02              JLE     CRE                     ;JUMP IF CURRENT VALUE .LE. BOUND
479D 05F2              DEC     BIN_AG                  ;ELSE, DECREMENT BIN_AG
```

```
              CRE:         ;CONVERT REVISED ESTIMATE_TO_BCD 479F 281A            .SCALL   CLEAR_SS_BCD        ;CLEAR 7-SEGMENT BCD ARRAY

47A1 A0F2A0          LD      ARG,BIN_AG          ;LOAD INPUT TO CONVERSION ROUTINE
47A4 8800A0          CMP     ARG,0               ;DETERMINE FLAGS
47A7 D605            JGE     ABSV                ;JUMP IF MAGNITUDE IS POSITIVE

47A9 03A0            NEG     ARG                 ;CONVERT NEGATIVE INPUT TO POSITIVE
47AB B114B7          LDB     SS_T-3,#MINUS_CODE  ;LOAD "-" IN 7-SEGMENT DISPLAY

47AE A1BA00CA  ABSV: LD      A_PTR,#SS_T         ;POINT TO DISPLAY IMAGE FOR DESTINATION
47B2 2D0A            SCALL   BIN_TO_BCD3

;************************************************************************
;SUBROUTINE: LOAD_ANGLE_GAIN
;     INS:
;     OUTS:
; DESTROYS:
;    CALLS:
;  DESCRIPT:
;************************************************************************

LOAD_ANGLE_GAIN:

47B4 B10253          LDB     SS_DC,#00000010B
47B7 EF3EF9          LCALL   LOAD_SS11
47BA F0             RET                          ;RETURN FROM LOAD_ANGLE_GAIN

;************************************************************************
;SUBROUTINE: CLEAR_SS_BCD
;     INS:
;     OUTS:
; DESTROYS:
;    CALLS:
;  DESCRIPT: CLEAR BCD STAGING ARRAY
;************************************************************************

CLEAR_SS_BCD:

47BB B107D6          LDB     COUNT,#7            ;LOAD 7 BYTES
47BE ADB4CA          LDBZE   A_PTR,#SS_6-2       ;POINT TO BCD ARRAY
47C1 B10AD4          LDB     VECT_IN,#BLANK_CODE
47C4 C6CBD4  CLRSSL: STB     VECT_IN,[A_PTR]+
47C7 E0D6FA          DJNZ    COUNT,CLRSSL
47CA F0             RET                          ;RETURN FROM CLEAR_SS_BCD

I             INCLUDE ICONS.ASC
I
I             ;************************************************************************
I             ;SUBROUTINE: LOAD_ICON_DEST
I             ;     INS:
I             ;     OUTS: ICON_P
I             ; DESTROYS: ICON_P, PNTR_T, PNTR_T1, PNTR_S, PNTR_S1, TEMP2, LCNT
I             ;    CALLS:
I             ;  DESCRIPT: LOADS AN ICON DESTRICTIVELY INTO THE PHASE A AND PHASE B
I             ;            OF THE CURRENTLY SELECTED IMAGE.
I             ;************************************************************************
I             LOAD_ICON_DEST:
I             LIDE_SELBNK:                        ;SELECT THE BANK IN WHICH TO WRITE THE
```

```
                                                              ; ICON.
147CB 375A0A        JBC     D_CNTRL,7,LIDE_1_FIL  ;IF BANK 1 IS BEING WRITTEN INTO JUMP
                                                              ; AHEAD TO SET UP THE POINTERS TO
                                                              ; OPERATE ON BANK 1.
            LIDE_2_FIL:                           ;ELSE-SET POINTERS FOR BANK 2.
147CE A1C0B98A      LD      PNTR_T,#DMI2A
147D2 A130BA8E      LD      PNTR_T1,#DMI2B
147D6 2008          SJMP    LIDE_SB_DNE

LOAD_ICON_DMI1_DEST:

LIDE_1_FIL:                           ;SET POINTERS FOR BANK 1.
147D8 A170B88A      LD      PNTR_T,#DMI1A
147DC A1E0B68E      LD      PNTR_T1,#DMI1B

LIDE_SB_DNE:                          ;DONE WITH BANK SELECTION.

LIDE_FILL:                            ;FILL THE SELECTED DOT MATRIX IMAGE
                                                              ; WITH ICON.
147E0 AE6D84        LDBZE   TEMP2,[ICON_P]+       ;LOAD THE BYTE OFFSET INTO THE IMAGE
                                                              ; TO BEGIN LOADING THIS ICON AND STEP
                                                              ; THE POINTER TO POINT TO THE NUMBER
                                                              ; OF BYTES TO WRITE.
147E3 AE6D86        LDBZE   LCNT,[ICON_P]+        ;LOAD THE NUMBER OF BYTES IN THE ICON.

147E6 64848A        ADD     PNTR_T,TEMP2          ;CREATE THE STARTING ADDRESS OF THE
                                                              ; FIRST BYTE OF THE ICON FOR BOTH
147E9 64848E        ADD     PNTR_T1,TEMP2         ; PHASE A AND PHASE B IMAGES.

LIDE_L:                               ;LOOP HERE FOR NEXT ICON BYTE.
147EC B26084        LDB     TEMP2,[ICON_P]+       ;LOAD CURRENT ICON BYTE INTO A
                                                              ; TEMPORARY REGISTER AND STEP THE
                                                              ; ICON POINTER TO THE NEXT ICON BYTE.

147EF C68A84        STB     TEMP2,[PNTR_T]        ;WRITE THIS BYTE INTO THE PHASE A
                                                              ; IMAGE.
147F2 C68E84        STB     TEMP2,[PNTR_T1]       ;WRITE THIS BYTE INTO THE PHASE B
                                                              ; IMAGE.
147F5 6504008A      ADD     PNTR_T,#4             ;STEP TO THE NEXT ADJACENT TARGET BYTE
147F9 6504008E      ADD     PNTR_T1,#4            ; IN BOTH PHASE A AND PHASE B IMAGES.

147FD E086EC        DJNZ    LCNT,LIDE_L           ;DECREMENT THE ICON BYTE COUNTER AND
                                                              ; IF NOT ZERO JUMP BACK TO WRITE THE
                                                              ; NEXT ICON BYTE.
            LIDE_DNE:                             ;ELSE-RETURN
14800 F0            RET

ICON_1:
14801 00            DB 0             ;OFFSET
14802 1B            DB 27            ;BYTES IN THIS ICON
14803 00            DB 00000000B
14804 00            DB 00000000B
14805 00            DB 00000000B
14806 00            DB 00000000B
14807 00            DB 00000000B
14808 00            DB 00000000B
```

```
14809 00              DB 00000000B
1480A 00              DB 00000000B
1480B 00              DB 00000000B
1480C 00              DB 00000000B    ;
1480D 00              DB 00000000B
1480E 00              DB 00000000B
1480F 00              DB 00000000B
14810 00              DB 00000000B
14811 00              DB 00000000B
14812 00              DB 00000000B
14813 00              DB 00000000B
14814 00              DB 00000000B
14815 00              DB 00000000B
14816 00              DB 00000000B    ;
14817 00              DB 00000000B
14818 00              DB 00000000B
14819 00              DB 00000000B
1481A 00              DB 00000000B
1481B 00              DB 00000000B
1481C 00              DB 00000000B
1481D 00              DB 00000000B
;
;
;        ICON_OK?1:
1481E 02              DB 2            ;OFFSET
1481F 1B              DB 27           ;NUMBER OF BYTES
14820 E0              DB 11100000B
14821 10              DB 00010000B
14822 10              DB 00010000B
14823 E0              DB 11100000B
14824 00              DB 00000000B
14825 F0              DB 11110000B
14826 80              DB 10000000B
14827 40              DB 01000000B
14828 30              DB 00110000B
14829 00              DB 00000000B    ;
1482A 00              DB 00000000B
1482B 20              DB 00100000B
1482C 10              DB 00010000B
1482D 10              DB 00010000B
1482E 90              DB 10010000B
1482F 60              DB 01100000B
14830 00              DB 00000000B
14831 00              DB 00000000B
14832 00              DB 00000000B
14833 00              DB 00000000B    ;
14834 00              DB 00000000B
14835 00              DB 00000000B
14836 00              DB 00000000B
14837 00              DB 00000000B
14838 00              DB 00000000B
14839 00              DB 00000000B
1483A 00              DB 00000000B
;
;
;        ICON_OK?2:
1483B 03              DB 3            ;OFFSET
```

```
1483C 1A        DB 26           ;NUMBER OF BYTES
1483D 03        DB 00000011B
1483E 04        DB 00000100B
1483F 04        DB 00000100B
14840 03        DB 00000011B
14841 00        DB 00000000B
14842 07        DB 00000111B
14843 00        DB 00000000B
14844 01        DB 00000001B
14845 06        DB 00000110B
14846 00        DB 00000000B  ;
14847 00        DB 00000000B
14848 00        DB 00000000B
14849 00        DB 00000000B
1484A 05        DB 00000101B
1484B 00        DB 00000000B
1484C 00        DB 00000000B
1484D 00        DB 00000000B
1484E 00        DB 00000000B
1484F 00        DB 00000000B
14850 00        DB 00000000B  ;
14851 00        DB 00000000B
14852 00        DB 00000000B
14853 00        DB 00000000B
14854 00        DB 00000000B
14855 00        DB 00000000B
14856 00        DB 00000000B
14857 00        DB 00000000B
;
;
;
;               ICON_DONE1:
14858 02        DB 2            ;OFFSET
14859 14        DB 20           ;BYTES IN THIS ICON
1485A F0        DB 11110000B
1485B 10        DB 00010000B
1485C 10        DB 00010000B
1485D E0        DB 11100000B
1485E 00        DB 00000000B
1485F E0        DB 11100000B
14860 10        DB 00010000B
14861 10        DB 00010000B
14862 E0        DB 11100000B
14863 00        DB 00000000B  ;
14864 F0        DB 11110000B
14865 40        DB 01000000B
14866 80        DB 10000000B
14867 00        DB 00000000B
14868 F0        DB 11110000B
14869 00        DB 00000000B
1486A F0        DB 11110000B
1486B 90        DB 10010000B
1486C 90        DB 10010000B
1486D 10        DB 00010000B  ;
;
;
```

```
       I         ICON_DONE2:
14B6E 03           DB 3              ;OFFSET
14B6F 14           DB 20             ;BYTES IN THIS ICON
14B70 07           DB 00000111B
14B71 04           DB 00000100B
14B72 04           DB 00000100B
14B73 03           DB 00000011B
14B74 00           DB 00000000B
14B75 03           DB 00000011B
14B76 04           DB 00000100B
14B77 04           DB 00000100B
14B78 03           DB 00000011B
14B79 00           DB 00000000B      ;
14B7A 07           DB 00000111B
14B7B 00           DB 00000000B
14B7C 00           DB 00000000B
14B7D 01           DB 00000001B
14B7E 07           DB 00000111B
14B7F 00           DB 00000000B
14B80 07           DB 00000111B
14B81 04           DB 00000100B
14B82 04           DB 00000100B
14B83 04           DB 00000100B      ;
       I
       I
       I         ICON_ROLL:
14B84 00           DB 0              ;OFFSET
14B85 1B           DB 27             ;BYTES IN THIS ICON
14B86 FE           DB 11111110B
14B87 32           DB 00110010B
14B88 52           DB 01010010B
14B89 8C           DB 10001100B
14B8A 00           DB 00000000B
14B8B 7C           DB 01111100B
14B8C 82           DB 10000010B
14B8D 82           DB 10000010B
14B8E 7C           DB 01111100B
14B8F 00           DB 00000000B      ;
14B90 FE           DB 11111110B
14B91 80           DB 10000000B
14B92 80           DB 10000000B
14B93 80           DB 10000000B
14B94 00           DB 00000000B
14B95 FE           DB 11111110B
14B96 80           DB 10000000B
14B97 80           DB 10000000B
14B98 80           DB 10000000B
14B99 00           DB 00000000B      ;
14B9A 00           DB 00000000B
14B9B 00           DB 00000000B
14B9C 00           DB 00000000B
14B9D 00           DB 00000000B
14B9E 00           DB 00000000B
14B9F 00           DB 00000000B
14BA0 00           DB 00000000B
       I
       I
```

```
;              ICON_DE6g1:
148A1 01              DB 1                ;OFFSET
148A2 1B              DB 27               ;BYTES IN THIS ICON
148A3 FE              DB 11111110B
148A4 82              DB 10000010B
148A5 82              DB 10000010B
148A6 7C              DB 01111100B
148A7 00              DB 00000000B
148A8 FE              DB 11111110B
148A9 92              DB 10010010B
148AA 92              DB 10010010B
148AB 82              DB 10000010B
148AC 00              DB 00000000B        ;
148AD 7C              DB 01111100B
148AE 82              DB 10000010B
148AF 92              DB 10010010B
148B0 74              DB 01110100B
148B1 00              DB 00000000B
148B2 C0              DB 11000000B
148B3 60              DB 01100000B
148B4 30              DB 00110000B
148B5 18              DB 00011000B
148B6 0C              DB 00001100B        ;
148B7 00              DB 00000000B
148B8 60              DB 01100000B
148B9 90              DB 10010000B
148BA 90              DB 10010000B
148BB F0              DB 11110000B
148BC 00              DB 00000000B
148BD 00              DB 00000000B
148BE 00              DB 00000000B
148BF 00              DB 00000000B
148C0 00              DB 00000000B
;
;
;
;             ICON_DE6g2:                 ;BOTTOM PART OF g.
148C1 02              DB 2                ;OFFSET
148C2 1B              DB 27               ;BYTES IN THIS ICON
148C3 00              DB 00000000B
148C4 00              DB 00000000B
148C5 00              DB 00000000B
148C6 00              DB 00000000B
148C7 00              DB 00000000B
148C8 00              DB 00000000B
148C9 00              DB 00000000B
148CA 00              DB 00000000B
148CB 00              DB 00000000B
148CC 00              DB 00000000B        ;
148CD 00              DB 00000000B
148CE 00              DB 00000000B
148CF 00              DB 00000000B
148D0 00              DB 00000000B
148D1 00              DB 00000000B
148D2 00              DB 00000000B
148D3 00              DB 00000000B
148D4 00              DB 00000000B
```

```
148D5 00              DB 00000000B
148D6 00              DB 00000000B   ;
148D7 00              DB 00000000B
148D8 00              DB 00000000B
148D9 04              DB 00000100B
148DA 04              DB 00000100B
148DB 03              DB 00000011B
148DC 00              DB 00000000B
148DD 00              DB 00000000B
148DE 00              DB 00000000B
148DF 00              DB 00000000B
148E0 00              DB 00000000B
;
;
;        ICON_PITCH:
148E1 00              DB 0           ;OFFSET
148E2 1B              DB 27          ;BYTES IN THIS ICON
148E3 FE              DB 11111110B
148E4 12              DB 00010010B
148E5 12              DB 00010010B
148E6 0C              DB 00001100B
148E7 00              DB 00000000B
148E8 82              DB 10000010B
148E9 FE              DB 11111110B
148EA 82              DB 10000010B
148EB 00              DB 00000000B
148EC 02              DB 00000010B   ;
148ED 02              DB 00000010B
148EE FE              DB 11111110B
148EF 02              DB 00000010B
148F0 02              DB 00000010B
148F1 00              DB 00000000B
148F2 7C              DB 01111100B
148F3 82              DB 10000010B
148F4 82              DB 10000010B
148F5 44              DB 01000100B
148F6 00              DB 00000000B   ;
148F7 FE              DB 11111110B
148F8 10              DB 00010000B
148F9 10              DB 00010000B
148FA FE              DB 11111110B
148FB 00              DB 00000000B
148FC 00              DB 00000000B
148FD 00              DB 00000000B
;
;
;        ICON_LEVEL1:
148FE 00              DB 0           ;OFFSET
148FF 1B              DB 27          ;BYTES IN THIS ICON
14900 7F              DB 01111111B
14901 40              DB 01000000B
14902 40              DB 01000000B
14903 00              DB 00000000B
14904 7F              DB 01111111B
14905 49              DB 01001001B
14906 41              DB 01000001B
14907 00              DB 00000000B
```

```
14908 OF              DB 00001111B
14909 30              DB 00110000B    ;
1490A 40              DB 01000000B
1490B 30              DB 00110000B
1490C 0F              DB 00001111B
1490D 00              DB 00000000B
1490E 7F              DB 01111111B
1490F 49              DB 01001001B
14910 41              DB 01000001B
14911 00              DB 00000000B
14912 7F              DB 01111111B
14913 40              DB 01000000B    ;
14914 40              DB 01000000B
14915 00              DB 00000000B
14916 00              DB 00000000B
14917 00              DB 00000000B
14918 42              DB 01000010B
14919 7F              DB 01111111B
1491A 40              DB 01000000B
;
;          ICON_CAR1:
1491B 01              DB 1            ;OFFSET
1491C 1B              DB 27           ;BYTES IN THIS ICON
1491D 30              DB 00110000B
1491E 78              DB 01111000B
1491F 7C              DB 01111100B
14920 7E              DB 01111110B
14921 FE              DB 11111110B
14922 FF              DB 11111111B
14923 FF              DB 11111111B
14924 F9              DB 11111001B
14925 79              DB 01111001B
14926 79              DB 01111001B    ;
14927 7B              DB 01111011B
14928 7A              DB 01111010B
14929 7E              DB 01111110B
1492A 7C              DB 01111100B
1492B 7C              DB 01111100B
1492C 78              DB 01111000B
1492D 78              DB 01111000B
1492E FB              DB 11111000B
1492F FB              DB 11111000B
14930 FB              DB 11111000B    ;
14931 FB              DB 11111000B
14932 70              DB 01110000B
14933 70              DB 01110000B
14934 70              DB 01110000B
14935 20              DB 00100000B
14936 80              DB 10000000B
14937 FF              DB 11111111B
;
;
;          ICON_LEVEL2:
14938 00              DB 0            ;OFFSET
14939 1B              DB 27           ;BYTES IN THIS ICON
1493A 7F              DB 01111111B
1493B 40              DB 01000000B
```

```
1493C 40          DB 01000000B
1493D 00          DB 00000000B
1493E 7F          DB 01111111B
1493F 49          DB 01001001B
14940 41          DB 01000001B
14941 00          DB 00000000B
14942 0F          DB 00001111B
14943 30          DB 00110000B     ;
14944 40          DB 01000000B
14945 30          DB 00110000B
14946 0F          DB 00001111B
14947 00          DB 00000000B
14948 7F          DB 01111111B
14949 49          DB 01001001B
1494A 41          DB 01000001B
1494B 00          DB 00000000B
1494C 7F          DB 01111111B
1494D 40          DB 01000000B     ;
1494E 40          DB 01000000B
1494F 00          DB 00000000B
14950 00          DB 00000000B
14951 72          DB 01110010B
14952 49          DB 01001001B
14953 49          DB 01001001B
14954 46          DB 01000110B
                  ICON_CAR2:
14955 01          DB 1             ;OFFSET
14956 1B          DB 27            ;BYTES IN THIS ICON
14957 20          DB 00100000B
14958 70          DB 01110000B
14959 70          DB 01110000B
1495A 70          DB 01110000B
1495B F8          DB 11111000B
1495C F8          DB 11111000B
1495D F8          DB 11111000B
1495E F8          DB 11111000B     ;
1495F 78          DB 01111000B
14960 78          DB 01111000B
14961 7C          DB 01111100B
14962 7C          DB 01111100B
14963 7E          DB 01111110B
14964 7A          DB 01111010B
14965 7B          DB 01111011B
14966 79          DB 01111001B
14967 79          DB 01111001B
14968 F9          DB 11111001B     ;
14969 FF          DB 11111111B
1496A FF          DB 11111111B
1496B FE          DB 11111110B
1496C 7E          DB 01111110B
1496D 7C          DB 01111100B
1496E 78          DB 01111000B
1496F 30          DB 00110000B
14970 80          DB 10000000B
14971 FF          DB 11111111B
```

```
;************************************************************************
;SUBROUTINE: PROCESS_OFFSET
;     INS: NONE
;     OUTS:
; DESTROYS:
;    CALLS:
; DESCRIPT:
;************************************************************************
```

| OFF8 = | FSP | EQU | 00FF8H | ;FULL SCALE PLUS |
| F000 = | FSM | EQU | 0F000H | ;FULL SCALE MINUS |

```
              ;FORMAT OF CLIP_FLGS:  B0-POSITIVE CLIP X_IN
              ;                      B1-NEGATIVE CLIP X_IN
              ;                      B2-POSITIVE CLIP Y_IN
              ;                      B3-NEGATIVE CLIP Y_IN

PROCESS_OFFSET:

4972 0184             CLR    TEMP           ;CLEAR TEMPORARY FLAGS REGISTER
4974 89F80FE0         CMP    X_IN,#FSP      ;COMPARE X_IN WITH POSITIVE FULL-SCALE
4978 D703             JNE    P01            ;JUMP IF NOT IN POSITIVE CLIPPING
497A 910184           ORB    TEMP,#1        ;ELSE, SET BIT 0
              P01:
497D 8900F0E0         CMP    X_IN,#FSM      ;COMPARE X_IN WITH MINUS FULL-SCALE
4981 D703             JNE    P02            ;JUMP IF NOT IN NEGATIVE CLIPPING
4983 910284           ORB    TEMP,#2        ;ELSE, SET BIT 1
              P02:
4986 89F80FE2         CMP    Y_IN,#FSP      ;COMPARE Y_IN WITH POSITIVE FULL-SCALE
498A D703             JNE    P03            ;JUMP IF NOT IN POSITIVE CLIPPING
498C 910484           ORB    TEMP,#4        ;ELSE, SET BIT 2
              P03:
498F 8900F0E2         CMP    Y_IN,#FSM      ;COMPARE Y_IN WITH MINUS FULL-SCALE
4993 D703             JNE    P04            ;JUMP IF NOT IN NEGATIVE CLIPPING
4995 910884           ORB    TEMP,#8        ;ELSE, SET BIT 3
              P04:

4998 C70122BC         STB    TEMP,OVF_FLG   ;STORE CLIPPING FLAGS
-499C 84

499D 6B0120BC         SUB    X_IN,OFFSET    ;SUBTRACT OFFSET FROM ACCELEROMETER INPUTS
-49A1 E0
49A2 6B0120BC         SUB    Y_IN,OFFSET    ;
-49A6 E2
49A7 6B0120BC         SUB    Z_IN,OFFSET    ;
-49AB E4

49AC F0               RET                   ;RETURN FROM PROCESS_OFFSET
```

```
;************************************************************************
;SUBROUTINE: OUT_CLIP
;     INS: NONE
;     OUTS:
; DESTROYS:
;    CALLS:
; DESCRIPT:
;************************************************************************
```

OUT_CLIP:

```
49AD B30122BC    LDB    TEMP,OVF_FLG         ;SET CLIPPING FLAGS
49B1 54
49B2 308404      JBC    TEMP,0,OC1           ;JUMP IF BIT 0 CLEAR
49B5 A1FF00BE    LD     X_OUT,#00FFH         ;ELSE, SET X_OUT = FULL SCALE POSITIVE
         OC1:
49B9 318404      JBC    TEMP,1,OC2           ;JUMP IF BIT 1 CLEAR
49BC A100FFBE    LD     X_OUT,#0FF00H        ;ELSE, SET X_OUT = FULL SCALE NEGATIVE
         OC2:
49C0 328404      JBC    TEMP,2,OC3           ;JUMP IF BIT 2 CLEAR
49C3 A1FF00C0    LD     Y_OUT,#00FFH         ;ELSE, SET Y_OUT = FULL SCALE POSITIVE
         OC3:
49C7 338404      JBC    TEMP,3,OC4           ;JUMP IF BIT 3 CLEAR
49CA A100FFC0    LD     Y_OUT,#0FF00H        ;ELSE, SET Y_OUT = FULL SCALE NEGATIVE
         OC4:
49CE F0          RET                         ;RETURN FROM OUT_CLIP

;****************************************************************************
;SUBROUTINE: ROT_MEM_INIT
;      INS: NONE
;     OUTS:
; DESTROYS:
;    CALLS:
; DESCRIPT: INITIALIZE ROTATION MEMORY PARAMETERS TO DEFAULT VALUES
;****************************************************************************

ROT_MEM_INIT:

;DIGITIZE INPUT AXIS ERROR CHANNEL &
                                              ; SCALE APPROPRIATELY.
                 IF 0
                 CLR    ARG                  ;INPUT ERROR = 0 FOR NOW
                 LCALL  CALC_IA_M            ;CALCULATE INPUT AXIS ERROR
                 ENDIF                       ; CORRECTION MATRIX.

49CF A1F2BBCA    LD     A_PTR,#LEVEL_M       ;SET LEVELING MATRIX = [I]
49D3 EF72FA      LCALL  IDENT_MAT            ;LOAD IDENTITY MATRIX

;SET COMPOSITE ROTATION MATRIX = IA_M
49D6 A1124ACA    LD     SOURCE,#IA_M         ;POINT TO SOURCE
49DA A104BCCC    LD     DEST,#COMP_M         ;POINT TO DESTINATION
49DE B109D6      LDB    COUNT,#9             ;COPY 9 WORDS
49E1 EF7DFB      LCALL  COPY                 ;COPY INPUT CORRECTION MATRIX TO COMPOSITE

49E4 A116BCCA    LD     A_PTR,#LOCAL_GRAV
49E8 B149D6      LDB    COUNT,#(KEY_FLAG-LOCAL_GRAV)
49EB C6CB00 MEM_IL: STB 0,[A_PTR]+
49EE E0D6FA      DJNZ   COUNT,MEM_IL

49F1 A14100F2    LD     BIN_AG,#ROLL_INIT    ;SET DEFAULT ROLL GAIN
49F5 C30126BC    ST     BIN_AG,BIN_ROLL_GAIN ;
49F9 F2
49FA A11DECCA    LD     A_PTR,#ROLL_GAIN     ;POINT TO RADIAN ROLL GAIN
49FE EF62FB      LCALL  BIN_AG_TO_RAD        ;CONVERT TO RADIANS & STORE
```

```
4A... A11500F2       LD     BIN_AG,#PITCH_INIT      ;SET DEFAULT PITCH GAIN
4A05 C30128BC        ST     BIN_AG,BIN_PITCH_GAIN   ;
-4A09 F2
4A0A A11EBCCA        LD     A_PTR,#PITCH_GAIN       ;POINT TO RADIAN PITCH GAIN
4A0E EF52FB          LCALL  BIN_AG_TO_RAD           ;CONVERT TO RADIANS & STORE

4A11 F0              RET

IA_M:  ;INPUT AXES CORRECTION MATRIX. SEE ANALYSIS OF 11-11-86

;  ;IDENTITY MATRIX
                     ;  DW    2000H,0,0
                     ;  DW    0,2000H,0
                     ;  DW    0,0,2000H

;INPUT AXIX ERROR ANGLE = 3.1 DEGREES.
4A12 F41F BB01       DW     8180,443,0
4A16 0000
4A18 45FE F41F       DW     -443,8180,0
4A1C 0000
4A1E 45FE 1800       DW     -443,24,8204
4A22 0C20

;###################################################################
;SUBROUTINE: ROT_PWR_UP
;     INS:
;     OUTS:
; DESTROYS:
;    CALLS:
; DESCRIPT:
;###################################################################

ROT_PWR_UP:

;DIGITIZE & STORE OFFSET CHANNEL

4A24 B10B02          LDB    AD_CMD,#1011B           ;READ OFFSET ON A/D CHANNEL 3

4A27 FD              NOP                            ;WAIT 8 STATES FOR CAM PROCESSING
4A28 FD              NOP                            ;

4A29 3302FD          JBS    AD_LO,3,$               ;WAIT TIL CONVERSION DONE

4A2C B00294          LDB    TEMP,AD_LO              ;GET RESULT
4A2F B00385          LDB    TEMP+1,AD_HI            ;

4A32 71C084          ANDB   TEMP,#0C0H              ;RETAIN 10 MSD'S

4A35 958085          XORB   TEMP+1,#80H             ;COMPLEMENT MSB TO CONVERT TO 2'S COMP

4A38 0A0384          SHRA   TEMP,#3                 ;SCALE

4A3B C30128BC        ST     TEMP,OFFSET             ;STORE OFFSET
-4A3F 84
4A40 F0              RET                            ;RETURN FROM ROT_PWR_UP
```

PROCESS_SAMPLE_TRIAD1:

```
4A41 A0E0EE        LD      X_OUT,X_IN           ;LOAD X INPUT
4A44 0A04EE        SHRA    X_OUT,#4             ;SCALE TO GARY'S FORMAT
4A47 A0E2C0        LD      Y_OUT,Y_IN           ;LOAD Y INPUT
4A4A 0A04C0        SHRA    Y_OUT,#4             ;SCALE TO GARY'S FORMAT

4A4D FD            NOP

4A4E EF24F8        LCALL   PROCESS_SAMPLE_TRIAD

4A51 FD            NOP
4A52 FD            NOP
4A53 FD            NOP                           ;LD    LDLVL_X_VAL,X_OUT

4A54 F0            RET

0000               END
```

| ;IT Symbol Name | Type Value | ;IT Symbol Name | Type Value |
|---|---|---|---|
| ABSV. | L 47AE | BIN_TO_BCD3 | L 44BE |
| ACCUML. | L 4506 | BIN_TO_TIME | L 44AB |
| ACCUM_AVG | L 44F6 | BLANK_CODE. | I 000A |
| ADV | L 46DF | BR_CAL. | L 4640 |
| ADV1. | L 4746 | BYL | L 00A4 |
| AD_CH0. | I 00E0 | B_PTR | I 00CE |
| AD_CH1. | I 00E2 | C3RET | L 470B |
| AD_CH2. | I 00E4 | C7RET | L 4772 |
| AD_CH3. | I 00E6 | CAL1. | L 4655 |
| AD_CH4. | I 00E8 | CAL1_1. | L 4675 |
| AD_CH5. | I 00EA | CAL1_RET. | L 467C |
| AD_CMD. | I 0002 | CAL2. | L 467D |
| AD_HI | I 0003 | CAL2_1. | L 469D |
| AD_LO | I 0002 | CAL2_RET. | L 46A4 |
| ANG_GT. | L 4184 | CAL3. | L 46A5 |
| ANG_LT. | L 4196 | CAL_1. | L 46D4 |
| ARCSIN. | L 416F | CAL7. | L 470C |
| ARCTAN. | L 4187 | CAL7_1. | L 473B |
| ARCTAN_A_DIV_B. | L 45E0 | CALCL | L 452E |
| ARG | I 00A0 | CALC_ANGLE_GAIN | L 4571 |
| AUTO_DEC. | L 46F7 | CALC_AVG. | L 4527 |
| AUTO_DEC1 | L 475E | CALC_IA_M | L 44A2 |
| AUTO_INC. | L 46E9 | CALC_PITCH_ROLL_MATRIX. | L 4314 |
| AUTO_INC1 | L 474F | CALC_ROLL_PITCH_LEVEL | L 4418 |
| AVERAGE | L 4304 | CAL_DONE. | L 4642 |
| AVG_COUNT | L BC5C | CAL_IDLE. | L 4654 |
| AYL | L 00A0 | CAL_MODE. | I 00F0 |
| A_PTR | I 00CA | CAL_N. | I 00F6 |
| A_SIN | I 00BE | CAL_N_OK. | L 4635 |
| A_TAN | I 00BE | CAL_TABLE | L 45F0 |
| BAUD_RATE | I 000E | CHAN_NUM. | L BC62 |
| BCD3_TO_BIN | L 44D0 | CLEAR_ALL | I 40E6 |
| BIN_AG. | I 00F2 | CLEAR_DIG | I 40F2 |
| BIN_AG_TO_RAD | L 4563 | CLEAR_DMI1. | I 40E9 |
| BIN_PITCH_GAIN. | L BC28 | CLEAR_SSI1. | I 40EC |
| BIN_ROLL_GAIN | L BC26 | CLEAR_SS_BCD. | L 47BB |
| BIN_TO_BCD2 | L 44B9 | CLIP_HI | L 42F6 |

| ;T Symbol Name | Type Value |
|---|---|
| CLIP_LO | L 42FC |
| CLM | L 43B3 |
| CLRL | L 44EA |
| CLRSSL | L 47C4 |
| CLR_AVG | L 44E3 |
| CNVL1 | L 44C1 |
| CNVL2 | L 44D5 |
| COL1 | L 4220 |
| COL_INDEX | I 00D0 |
| COMP_M | L BC04 |
| COPY | L 4261 |
| COPYB | L 426B |
| COPYB_L | L 426B |
| COPY_L | L 4261 |
| CORRECT_IA | L 4389 |
| COS | I 00C0 |
| COUNT | I 00D6 |
| COWL | L 4200 |
| CPL | L 4227 |
| CPL_INDEX | I 00D6 |
| CPE | L 479F |
| CYL | L 00A8 |
| C_PTR | I 00CC |
| DEC_ANGLE_GAIN | L 4797 |
| DEG_TO_RAD | L 4556 |
| DEST | I 00CC |
| DISP_ANGLE_GAIN | L 47E1 |
| DISP_PITCH_GAIN | L 4773 |
| DISP_ROLL_GAIN | L 477A |
| DIS_SEL_ACT | L 462B |
| DMI1A | I B870 |
| DMI1B | I BEE0 |
| DMI2A | I B9C0 |
| DMI2B | I BA30 |
| DONE | L 414F |
| DUMP_PTR | L BC64 |
| DY | L 00BE |
| D_CNTRL | I 005A |
| EY | L 00C0 |
| FILLER | L BC24 |
| FSM | I F000 |
| FSP | I 0FF8 |
| FY | L 00C2 |
| GY | L 00C4 |
| HSI_MODE | I 0003 |
| HSI_STATUS | I 0006 |
| HSI_TIME | I 0004 |
| HSO_CMD | I 0006 |
| HSO_REG | I 0014 |
| HSO_TIME | I 0004 |
| HY | L 00C6 |
| IA_M | L 4A12 |
| ICON_1 | L 4801 |
| ICON_CAR1 | L 491B |
| ICON_CAR2 | L 4955 |
| ICON_DEGG1 | L 48A1 |
| ICON_DEGG2 | L 48C1 |
| ICON_DONE1 | L 485B |
| ICON_DONE2 | L 4B6E |
| ICON_LEVEL1 | L 48FE |
| ICON_LEVEL2 | L 493B |
| ICON_OK?1 | L 481E |
| ICON_OK?2 | L 483B |
| ICON_P | I 006C |
| ICON_PITCH | L 48E1 |
| ICON_ROLL | L 4884 |
| IDENT_MAT | L 4448 |
| INC_ANGLE_GAIN | L 478D |
| INT_1 | I 000A |
| INT_MASK | I 0008 |
| INT_N | I 0003 |
| INT_PENDING | I 0009 |
| INVTAN | L 41D2 |
| IOC0 | I 0015 |
| IOC1 | I 0016 |
| IOPORT0 | I 000E |
| IOPORT1 | I 000F |
| IOPORT2 | I 0010 |
| IOS0 | I 0015 |
| IOS1 | I 0016 |
| IOS2 | I 0017 |
| IY | L 00C8 |
| I_L | L 4448 |
| JY | L 00CA |
| KEY_FLAG | L BC5F |
| KEY_TIME | I 00F8 |
| KEY_TIMER | L BC5E |
| KY | L 00CC |
| LL | I 0086 |
| LEVEL_M | L BBF2 |
| LIDE_1_FIL | L 47D8 |
| LIDE_2_FIL | L 47CE |
| LIDE_DNE | L 4800 |
| LIDE_FILL | L 47E0 |
| LIDE_L | L 47EC |
| LIDE_SB_DNE | L 47E0 |
| LIDE_SELBNK | L 47C9 |
| LOAD_ANGLE_GAIN | L 47B4 |
| LOAD_ICON_DEST | L 47CB |
| LOAD_ICON_DMI1 | I 40EF |
| LOAD_ICON_DMI1_DEST | L 47D8 |
| LOAD_SSI1 | I 40F5 |
| LOCAL_6 | I 00CA |
| LOCAL_GRAV | L BC16 |
| LOOP | L 4135 |
| LY | L 00CE |
| L_BOUND | I FFCE |
| M11 | L 00AC |
| M12 | L 00AE |
| M13 | L 00B0 |

| ;IT Symbol Name | Type Value |
|---|---|
| M21 | L 00B2 |
| M22 | L 00B4 |
| M23 | L 00B6 |
| M31 | L 00B8 |
| M32 | L 00BA |
| M33 | L 00BC |
| MAG2 | L 43F5 |
| MAG3 | L 43FA |
| MAGX | L 43FD |
| MAG_AVG | L BC58 |
| MAG_L | L 4405 |
| MAG_X_Y | L 435B |
| MATRIX_TO_REGS | L 4576 |
| MAT_MAT | L 421A |
| MAT_PTR | I 00CE |
| MAT_VECT3 | L 41EA |
| MEM_IL | L 49EB |
| MINUS_CODE | I 0014 |
| MODE_SW | I 0080 |
| MODE_TASK | I 007A |
| MP_CAL | L 4613 |
| MP_SMP_C | I 0081 |
| MP_START_SCALE | I 40FB |
| MP_STOP | I 40F8 |
| MP_STRT_CAL | L 45F8 |
| MP_STRT_CAL1 | L 4604 |
| MP_STRT_CAL_RET | L 462A |
| MP_TEMP | I 00A0 |
| MUL_RES | I 00A0 |
| NY | L 0000 |
| OC1 | L 49B9 |
| OC2 | L 49C0 |
| OC3 | L 49C7 |
| OL | L 49CE |
| OFFSET | L BC20 |
| OLD_IA_M | L BBE0 |
| OUT_CLIP | L 49AD |
| OVF_FLG | L BC22 |
| PITCH | I 00CE |
| PITCH1 | I BC1A |
| PITCH_GAIN | L BC1E |
| PITCH_INIT | I 0015 |
| PITCH_MAG_FAST | L BC4A |
| PITCH_MAG_SLOW | L BC42 |
| PITCH_X_FAST | L BC44 |
| PITCH_X_SLOW | L BC3C |
| PITCH_Y_FAST | L BC46 |
| PITCH_Y_SLOW | L BC3E |
| PITCH_Z_FAST | L BC48 |
| PITCH_Z_SLOW | L BC40 |
| PI_OVR_4 | I 1922 |
| PNTR_COLLAPSE | I 40E0 |
| PNTR_EXPAND | I 40E3 |
| PNTR_S | I 0088 |
| PNTR_S1 | I 008C |
| PNTR_T | I 008A |
| PNTR_T1 | I 008E |
| P01 | L 497D |
| P02 | L 4986 |
| P03 | L 498F |
| P04 | L 4998 |
| POSITION1 | L 4392 |
| POSITION2 | L 43D1 |
| POS_B | L 4591 |
| PROCESS_OFFSET | L 4972 |
| PROCESS_SAMPLE_TRIAD | L 4275 |
| PROCESS_SAMPLE_TRIAD1 | L 4A41 |
| PWM_CONTROL | I 0017 |
| PY | L 00D2 |
| QY | L 00D4 |
| R0 | I 0000 |
| RAD_TO_DEG | L 4541 |
| RESULT | I 00A4 |
| ROLL | I 00CC |
| ROLL1 | L BC19 |
| ROLL_GAIN | L BC1C |
| ROLL_INIT | I 0041 |
| ROLL_MAG_FAST | L BC3A |
| ROLL_MAG_SLOW | L BC32 |
| ROLL_X_FAST | L BC34 |
| ROLL_X_SLOW | L BC2C |
| ROLL_Y_FAST | L BC36 |
| ROLL_Y_SLOW | L BC2E |
| ROLL_Z_FAST | L BC38 |
| ROLL_Z_SLOW | L BC30 |
| ROTATE_TO_LEVEL | L 4380 |
| ROTATE_VECT | L 436A |
| ROT_MEM_INIT | L 49CF |
| RO_PWR_UP | L 4A24 |
| ROWL | L 41F5 |
| ROWL1 | L 421D |
| ROW_INDEX | I 00D2 |
| RT0 | L 45DD |
| RTD | L 46EE |
| RTD1 | L 4755 |
| RUN_T | I 00F4 |
| RY | L 00D6 |
| SBUF | I 0007 |
| SCALE_CLIP | L 42DF |
| SIN | I 00BE |
| SINCOS | L 4150 |
| SOURCE | I 00CA |
| SP | I 0018 |
| SP_CON | I 0011 |
| SQRT | L 411B |
| SS_DC | I 005B |
| SS_G | I 0086 |
| SS_T | I 009A |
| STP_SET | L 4620 |
| ST_OUT | L 4300 |

```
;IT  Symbol Name          Type Value          ;IT  Symbol Name          Type Value
     SUM_PROD. . . . . . . . . . . . I 00A4         VECT_OUT_PTR. . . . . . . . . . . . I 00CC
     SWR . . . . . . . . . . . . . . I B857        VECT_TO_XYZ . . . . . . . . . . . . L 425B
     TAN_PI_OVR_8. . . . . . . . . . I 0D41         WATCHDOG. . . . . . . . . . . . I 000A
     TC3_REC . . . . . . . . . . . . L 46FB         X_AVG . . . . . . . . . . . . . L BC4C
     TC7_REC . . . . . . . . . . . . L 4762         X_IN. . . . . . . . . . . . . . I 00E0
     TEMP. . . . . . . . . . . . . . I 0084         X_OUT . . . . . . . . . . . . . I 00BE
     TEMP1 . . . . . . . . . . . . . I 00A4         Y_AVG . . . . . . . . . . . . . L BC50
     TEMP2 . . . . . . . . . . . . . I 0084         Y_IN. . . . . . . . . . . . . . I 00E2
     TEMP3 . . . . . . . . . . . . . I 00A8         Y_OUT . . . . . . . . . . . . . I 00C0
     TEMP_GRAV . . . . . . . . . . . L BC60         Z_AVG . . . . . . . . . . . . . L BC54
     TEMP_RAD_AG . . . . . . . . . . L BC2A         Z_IN. . . . . . . . . . . . . . I 00E4
     TIMER1. . . . . . . . . . . . . I 000A         Z_OUT . . . . . . . . . . . . . I 00C2
     TIMER2. . . . . . . . . . . . . I 000C
     U_BOUND . . . . . . . . . . . . I 0096    ;ZZ
     VECT_IN . . . . . . . . . . . . I 00D4
     VECT_IN_PTR . . . . . . . . . . I 00CA    00 Errors (0000)
```

Having described the invention in detail and by reference to preferred embodiments thereof, it will be apparent that modifications and variations are possible without departing from the scope of the invention defined in the appended claims.

What is claimed is:

1. A system for providing an indication of the acceleration experienced by a vehicle in the plane of the surface over which the vehicle moves, in which the system is mounted on the vehicle body and in which the suspension system of the vehicle permits the vehicle body to pitch and roll with respect to the surface when the vehicle is subjected to acceleration, comprising:

acceleration transducer means for providing indications of acceleration in nominal lateral, forward and vertical directions;

processor means, including:

leveling means, responsive to said indications from said acceleration transducer means, for providing indications of lateral and forward acceleration in a reference plane and of acceleration normal to the reference plane, with reference plane being fixed with respect to the body of the vehicle and horizontal when the vehicle is at rest on a horizontal surface, said leveling means performing the transformation:

$$[LEVEL] = \begin{bmatrix} \cos\beta & -\sin\alpha\sin\beta & -\cos\alpha\sin\beta \\ 0 & \cos\alpha & -\sin\alpha \\ \sin\beta & \sin\alpha\cos\beta & \cos\alpha\cos\beta \end{bmatrix} [TRANSDUCER],$$

where is the acceleration vector with respect to the reference plane, is the acceleration vector in the nominal lateral, forward and vertical directions, $\alpha$ is the angle between the nominal forward direction and the reference plane, and $\beta$ is the angle between the nominal lateral direction and the reference plane, roll and pitch compensation means, responsive to said indications from the leveling means, for providing indications of lateral and forward acceleration in the plane of said surface, and display means, responsive to said roll and pitch means, for displaying said indications of lateral and forward acceleration in the plane of said surface.

2. The system of claim 1 in which said acceleration transducer means comprises:

a three axis accelerometer transducer, and a three channel low pass filter, responsive to said transducer, for providing said indications of acceleration in nominal lateral, forward and vertical directions.

3. The system of claim 1 in which said processor means comprises:

analog to digital converter means for converting said indications of acceleration in nominal lateral, forward and vertical directions to digital form and for supplying indications of acceleration in digital form to said leveling means.

4. The system of claim 3 in which said leveling means and said roll and pitch compensation means comprise a programmed digital microprocessor.

5. The system of claim 4 in which said processor means further comprises a CMOS random access memory and a battery power supply for said memory.

6. The system of claim 5 in which said processor means further comprises keypad means for manual entry of data and control commands to said leveling means and said roll and pitch compensation means.

7. The system of claim 1 in which said display means comprises a dot matrix display.

8. The system of claim 7 in which said dot matrix display comprises a vacuum fluorescent display.

9. A system for providing an indication of the acceleration experienced by a vehicle in the plane of the surface over which the vehicle moves, in which the system is mounted on the vehicle body and in which the suspension system of the vehicle permits the vehicle body to pitch and roll with respect to the surface when the vehicle is subjected to acceleration, comprising:

acceleration transducer means for providing indications of acceleration in nominal lateral, forward and vertical directions;

processor means, including:

leveling means, responsive to said indications from said acceleration transducer means, for providing indications of lateral and forward acceleration in a reference plane and of acceleration normal to the reference plane, with reference plane being fixed with respect to the body of the vehicle and horizontal when the vehicle is at rest on a horizontal surface, roll and pitch compensation means, responsive to said indications from the leveling means, for providing indications of lateral and forward acceleration in the plane of said surface, said roll and pitch compensation means performing the transformation:

$$[\text{SURFACE}] = \begin{bmatrix} \cos\theta & -\sin\phi\sin\theta & -\cos\phi\sin\theta \\ 0 & \cos\phi & -\sin\phi \\ \sin\theta & \sin\phi\cos\theta & \cos\phi\cos\theta \end{bmatrix} [\text{LEVEL}],$$

where [SURFACE] is the acceleration vector with respect to the surface, [LEVEL] is the acceleration vector with respect to the reference plane, $\theta$ is the angle of roll of the vehicle body with respect to said surface, and $\phi$ is the angle of pitch with respect to said surface, and display means, responsive to said roll and pitch means, for displaying said indications of lateral and forward acceleration in the plane of said surface.

10. A system for providing an indication of the acceleration experienced by a vehicle in the plane of the surface over which the vehicle moves, in which the system is mounted on the vehicle body and in which the suspension system of the vehicle permits the vehicle body to pitch and roll with respect to the surface when the vehicle is subjected to acceleration, comprising:

acceleration transducer means for providing indications of acceleration in nominal lateral, forward and vertical directions;

processor means, including:
leveling means, responsive to said indications from said acceleration transducer means, for providing indications of lateral and forward acceleration in a reference plane and of acceleration normal to the reference plane, with reference plane being fixed with respect to the body of the vehicle and horizontal when the vehicle is at rest on a horizontal surface, roll and pitch compensation means, responsive to said indications from the leveling means, for providing indications of lateral and forward acceleration in the plane of said surface, said roll and pitch compensation means performing the transformation:

$$[\text{SURFACE}] = \begin{bmatrix} \cos\theta & -\sin\phi\sin\theta & -\cos\phi\sin\theta \\ 0 & \cos\phi & -\sin\phi \\ \sin\theta & \sin\phi\cos\theta & \cos\phi\cos\theta \end{bmatrix} [\text{LEVEL}],$$

where [SURFACE] is the acceleration vector with respect to the surface, [LEVEL] is the acceleration vector with respect to the reference plane, $\theta$ is the angle of roll of the vehicle body with respect to said surface, and $\phi$ is the angle of pitch with respect to said surface, wherein said roll and pitch compensation means determines $\theta$ and $\phi$ by the approximations:

$\theta = xR/(1+zR)$ and $\phi = yP/(1+zP)$, where x is the lateral acceleration component of the vector [LEVEL], z is the vertical acceleration component of the vector [LEVEL], y is the forward acceleration component of the vector [LEVEL], R is roll sensitivity of the vehicle, and P is the pitch sensitivity of the vehicle, and display means, responsive to said roll and pitch means, for displaying said indications of lateral and forward acceleration in the plane of said surface.

* * * * *